US012580441B2

(12) United States Patent
Prüssmeier et al.

(10) Patent No.: US 12,580,441 B2
(45) Date of Patent: Mar. 17, 2026

(54) ROTOR FOR A PLANAR DRIVE SYSTEM AND PLANAR DRIVE SYSTEM

(71) Applicant: Beckhoff Automation GmbH, Verl (DE)

(72) Inventors: Uwe Prüssmeier, Lemgo (DE); Jörg Neufeld, Paderborn (DE); Johannes Beckhoff, Schloß Holte-Stukenbrock (DE); Felix Schulte, Rietberg (DE)

(73) Assignee: Beckhoff Automation GmbH, Verl (DE)

( * ) Notice: Subject to any disclaimer, the term of this patent is extended or adjusted under 35 U.S.C. 154(b) by 222 days.

(21) Appl. No.: 18/505,311

(22) Filed: Nov. 9, 2023

(65) Prior Publication Data

US 2024/0079926 A1     Mar. 7, 2024

Related U.S. Application Data

(63) Continuation of application No. PCT/EP2022/062681, filed on May 10, 2022.

(30) Foreign Application Priority Data

May 11, 2021     (DE) ..................... 10 2021 112 269.4

(51) Int. Cl.
*H02K 5/10*          (2006.01)
*H02K 41/03*          (2006.01)
(52) U.S. Cl.
CPC ............. *H02K 5/10* (2013.01); *H02K 41/031* (2013.01); *H02K 2201/18* (2013.01)

(58) Field of Classification Search
CPC .......... H02K 2201/18; H02K 2203/03; H02K 41/031; H02K 5/10; H02K 5/1282; H02K 5/132; H02K 5/225
See application file for complete search history.

(56) References Cited

U.S. PATENT DOCUMENTS

| | | | |
|---|---|---|---|
| 8,674,563 | B2 | 3/2014 | Lamouree et al. |
| 10,858,192 | B2 | 12/2020 | Neufeld et al. |
| 10,974,914 | B2 | 4/2021 | Kleinikkink et al. |
| 11,437,902 | B2 * | 9/2022 | Brinkmann ............ B65G 54/02 |

(Continued)

FOREIGN PATENT DOCUMENTS

| | | |
|---|---|---|
| CN | 102263475 A | 11/2011 |
| CN | 110506019 A | 11/2019 |

(Continued)

OTHER PUBLICATIONS

Office Action dated Mar. 10, 2022 in connection with German patent application No. 10 2021 112 269.4, 20 pages including English translation.

(Continued)

*Primary Examiner* — Naishadh N Desai
(74) *Attorney, Agent, or Firm* — Dorsey & Whitney LLP

(57) ABSTRACT

A rotor for a planar drive system comprises a housing and at least one magnet arrangement. The housing comprises a basic housing body and a cover. The magnet arrangement is arranged in a recess of the basic housing body. The cover is attached to the basic housing body in such a way that the housing is configured to be fluid-tight, the cover covers the recess, and the magnet arrangement is arranged in an interior of the fluid-tight housing.

26 Claims, 25 Drawing Sheets

(56)                     References Cited

U.S. PATENT DOCUMENTS

| | | | |
|---|---|---|---|
| 2006/0174837 A1 | 8/2006 | Fujii et al. | |
| 2009/0033901 A1 | 2/2009 | Ito | |
| 2009/0179066 A1 | 7/2009 | Fujii et al. | |
| 2014/0346900 A1* | 11/2014 | Bobelis | H02K 41/031 |
| | | | 310/12.23 |
| 2016/0070181 A1* | 3/2016 | Frissen | H02K 41/02 |
| | | | 310/12.24 |
| 2019/0375597 A1 | 12/2019 | Kleinikkink et al. | |

FOREIGN PATENT DOCUMENTS

| | | | |
|---|---|---|---|
| DE | 102017108558 A1 | 10/2018 | |
| DE | 102017131304 A1 | 6/2019 | |
| DE | 102019117431 A1 * | 12/2020 | B65G 45/22 |

OTHER PUBLICATIONS

International Preliminary Report on Patentability dated Sep. 18, 2023 in connection with International Patent Application No. PCT/EP2022/062681, 22 pages including English translation.
International Search Report and Written Opinion dated Nov. 7, 2022 in connection with International patent application No. PCT/EP2022/062681, 20 pages including English translation.
Office Action dated Jul. 20, 2024 in connection with Chinese patent application No. 202280034252.9, 17 pages including English translation.

* cited by examiner

ROTOR FOR A PLANAR DRIVE SYSTEM AND PLANAR DRIVE SYSTEM

CROSS-REFERENCE TO RELATED APPLICATION

This application is a continuation of International Patent Application PCT/EP2022/062681, filed May 10, 2022, entitled ROTOR FOR A PLANAR DRIVE SYSTEM AND PLANAR DRIVE SYSTEM, which claims priority to German patent application DE 10 2021 112 269.4, filed May 11, 2021, entitled LÄUFER FÜR EIN PLANARANTRIEBS-SYSTEM UND PLANARANTRIEBSSYSTEM, each of which are incorporated by reference herein, in the entirety and for all purposes.

FIELD

The invention relates to a rotor for a planar drive system and to a planar drive system comprising such a rotor.

BACKGROUND

Planar drive systems may be used, among other things, in automation technology, in particular manufacturing technology, handling technology and process engineering. Planar drive systems may be used to move or position a moving element of a system or machine in at least two linearly independent directions. Planar drive systems may comprise a permanently energized electromagnetic planar motor having a planar stator and a rotor that may be moved in at least two directions on the stator.

In a permanently energized electromagnetic planar motor, a driving force is exerted on the rotor by the fact that energized coil groups of a stator assembly interact magnetically with driving magnets of a plurality of magnet arrangements of the rotor. Planar drive systems with rectangular and elongated coil groups and rectangular and elongated magnet arrangements of the rotor are known from the prior art. Such a planar drive system is e.g. described in DE 10 2017 131 304 A1. With the aid of such a planar drive system, in particular a linear and translational movement of the rotor is allowed for. This means that with the aid of such a planar drive system, the rotor may be freely moved in parallel to the stator surface above a stator surface under which the rectangular and elongated coil groups are arranged, and may be moved perpendicular with regard to the stator surface at least at different distances from the stator surface. Furthermore, such a planar drive system is capable of tilting the rotor by a few degrees and rotating it by a few degrees. The latter movements may be carried out above arbitrary positions of the stator surface. In particular, the rotor may be rotated from a normal position by up to 20°.

The rotors of a planar drive system typically comprise a basic housing body into which the magnet arrangements are inserted. The magnet arrangements may be glued to the housing body. It may be provided that the planar drive system is to be used within aggressive fluids or in sensitive environments. Sensitive environments may particularly include clean rooms or clean room-like environments, or vacuum chambers. If the rotor is to be used in an aggressive environment such as within water-based fluids such as water, acids or alkalis, or within organic solvents, the fluids may attack the adhesive with the aid of which the magnet arrangements are glued into the basic housing body, leading to medium- to long-term damage or destruction of the rotor. If the rotor is to be used in a clean room or in a vacuum, the adhesive used to bond the magnet arrangements into the basic housing body may outgas and thus contaminate the clean room or, when used in a vacuum, in particular in an ultra-high vacuum, the required vacuum quality may not be achieved.

SUMMARY

The invention provides a rotor for a planar drive system which may be used in aggressive media and/or may also be used in sensitive environments. The invention further provides a planar drive system with such a rotor.

According to a first aspect, a rotor comprises a housing and at least one magnet arrangement. The housing comprises a basic housing body and a cover, the magnet arrangement being arranged in a recess of the basic housing body, wherein the cover is attached to the basic housing body in such a way that the housing is embodied to be fluid-tight, the cover covers the recess and the magnet arrangement is arranged in an interior of the fluid-tight housing.

According to a second aspect, a planar drive system comprise at least one stator module. The stator module comprises at least one stator assembly with at least one coil arrangement, wherein the coil arrangement may be energized and is arranged to generate a stator magnetic field above a stator surface due to an energization, wherein the planar drive system further comprises a rotor, wherein the rotor may be moved above the stator surface with the aid of an interaction between the stator magnetic field and a rotor magnetic field of the magnet arrangement. The planar drive system further comprises a separating device, wherein the separating device is arranged above the stator surface, wherein the stator module is arranged on a first side of the separating device and the rotor is arranged on a second side of the separating device According to a first aspect, a planar drive system comprises a rotor, the rotor comprising a basic housing body with a recess, at least one magnet arrangement being arranged in the recess, a cover to the basic housing body in such a way that a housing is formed by the basic housing body and the cover, the housing being fluid-tight, and a magnet arrangement arranged in an interior of the housing

EXAMPLES

A rotor for a planar drive system comprises a housing and at least one magnet arrangement. The magnet arrangement may be embodied as a Halbach array, as described in DE 10 2017 131 304 A1. Likewise, as described in said disclosure, four such magnet arrangements may be arranged to allow for the rotor being driven in two directions. The housing of the rotor has a basic housing body and a cover. The magnet arrangement or, if there are a plurality of magnet arrangements, all magnet arrangements are arranged in a recess of the basic housing body. The cover is attached to the housing body in such a way that the housing is fluid-tight and the cover covers the recess. The magnet arrangement or the magnet arrangements are arranged in an interior of the fluid-tight housing.

By arranging the magnet arrangement inside of the fluid-tight housing, it may be achieved that, when the rotor is used in aggressive environments, the aggressive fluids cannot penetrate the fluid-tight housing and thus cannot attack any adhesive that may be used to glue the magnet arrangement into the basic housing body. Furthermore, the aggressive fluids also cannot attack the magnet arrangement itself if the magnet arrangement is located inside of the fluid-tight housing. If the rotor is to be used in a sensitive environment, the fluid-tight housing may ensure that the magnet arrangement or an adhesive used to glue the magnet arrangement into the basic housing body cannot reach an area outside the fluid-tight housing. This allows for achieving the required cleanliness in a clean room, for example, and the required vacuum quality in a vacuum. In particular, when used in a vacuum, magnet arrangements or adhesives used to glue the magnet arrangement into the basic housing body could outgas and thus permanently provide contaminants, so that an ultra-high vacuum cannot be achieved, for example. The cover may be non-magnetic, which may particularly mean that the cover is not ferromagnetic but diamagnetic or paramagnetic.

In an embodiment of the rotor, the cover comprises a relative magnetic permeability of less than ten, particularly less than two, and preferably less than 1.01.

In an embodiment of the rotor, the cover attenuates a magnetic field of the magnet arrangement outside of the housing by a maximum of 25%. Preferably, the attenuation is 10% at most and in particular preferably 5% at most. As the case may be, the cover may also be embodied in such a way that a magnetic field of the magnet arrangement is essentially not attenuated at all, i.e. by of 1% at most. This allows for the rotor to continue to be operated within the planar drive system, since the magnetic field of the magnet arrangements outside of the fluid-tight housing of the rotor is still present to such an extent that a stator magnetic field of the planar drive system may continue to act upon the rotor.

In an embodiment, the basic housing body and the cover have a metallic embodiment. The cover and the basic housing body are laser-welded. It may particularly be provided that the basic housing body and the cover are made of stainless steel, aluminum or an aluminum alloy. Welded joints may generally be embodied to be fluid-tight, i.e. gas- or liquid-tight, so that, on the one hand, if the rotor is operated within a liquid, no liquid may enter the interior of the housing and, on the other hand, if the rotor is operated in a clean room or a vacuum, liquids or gases cannot leave the interior of the housing. In order to weld the cover to the basic housing body, it has proven advantageous to use a laser welding process. Laser welding processes are particularly suitable since laser radiation is not affected by the quite strong magnetic field of the magnet arrangements, thus allowing for precise and fluid-tight welding. In contrast, if an electrofusion process was to be used, for example, the electrons used would be deflected by the magnetic field of the magnet arrangement and as a result it would not be possible to ensure that the welded joint could be embodied in a fluid-tight manner.

In an embodiment, the cover comprises a metal sheet. A metal sheet thickness is between 0.05 and 0.5 mm. Preferably, the metal sheet thickness is between 0.09 and 0.11 mm and in particular 0.1 mm. These metal sheet thicknesses are appropriate for laser welding, so that metal covers with these metal sheet thicknesses may be welded well to the basic housing body. This metal sheet thickness is particularly advantageous when stainless steel is used as the material for the cover. The basic housing body may also be made of stainless steel. Furthermore, the basic housing body and the cover may also be made of aluminum or an aluminum alloy. The basic housing body and the cover may further be made of different materials, for example, stainless steel for the basic housing body and aluminum for the cover.

In an embodiment, the basic housing body and/or the cover have a plastic. The cover and the basic housing body are laser-welded. In particular, a plastic cover may also be laser-welded to a metallic basic housing body or a metallic cover may be laser-welded to a plastic base body.

In an embodiment, a laser-welded joint between the basic housing body and the cover is arranged circumferentially in an edge region of the housing. This may mean that the basic housing body has a planar underside, whereas the recess in which the magnet arrangements are arranged originates from this planar underside. The cover is placed on the planar underside and then circumferentially fastened to the basic housing body with a laser-welded joint.

In an embodiment, the interior of the fluid-tight housing is at least partially evacuated. This may be particularly advantageous if the rotor is to be used inside of a vacuum.

In an embodiment, an evacuating device is attached to the housing. The evacuating device comprises a welded or soldered pipe. With the aid of the pipe, for example, a negative pressure may be generated inside of the housing and subsequently the pipe may be pressed shut with the aid of pliers or a press and welded and cut off at this point. This makes it possible to evacuate the interior of the housing.

In an embodiment, the interior of the fluid-tight housing is at least partially filled with a casting compound. This may be used, for example, to fill areas in which the recess where the magnet arrangement or assemblies are not located before the cover is fitted.

In an embodiment, the interior of the fluid-tight housing is cast with a PU casting compound without bubbles. PU casting compounds are particularly suitable for casting the housing. In an embodiment, the interior of the fluid-tight housing is water-free. This particularly allows for using the rotor in a sensitive environment such as a clean room or a vacuum. A further advantage of the water-free interior is that the rotor is easy to clean as a result if it is used in an aggressive environment, since, for example, cleaning with the aid of water and then heating the rotor to over 100° C. to dry the rotor is well possible. If water molecules were inside the rotor, they would evaporate when the rotor is heated to over 100° C., possibly creating excess pressure inside the rotor. This could lead to damage to the cover.

In an embodiment, the magnet arrangement may interact with a stator magnetic field and the rotor may be driven as a result.

In order to manufacture the rotor, a basic housing body comprises with a recess may be provided first. The basic housing body may have a planar underside from which the recess originates. Subsequently, at least one magnet arrangement may be arranged in the recess. Of course, a plurality of magnet arrangements may also be arranged within the recess. Subsequently, a cover is attached to the basic housing body in such a way that a housing formed from the basic housing body and the cover is embodied to be fluid-tight and the magnet arrangement is arranged in an interior of the fluid-tight housing. The basic housing body and the cover may have the properties described above.

In an embodiment of the method, the basic housing body and the cover are metallic. The cover and the basic housing body are laser-welded.

In an embodiment of the method, the rotor is in a vacuum while the cover is attached. As a result, the interior of the fluid-tight housing is free of water. Furthermore, this method may simultaneously achieve that the interior of the housing is evacuated.

In an embodiment of the method, the rotor is heated to more than 100° C. prior to or during the application of the cover. This also renders the interior of the fluid-tight housing free of water. In particular, the rotor may be heated before the cover unit is attached, thereby evaporating all water from the basic housing body and magnet arrangement. Now that the cover is in place, it may be laser-welded to the basic housing body and thus the rotor may be created with a fluid-tight housing and water-free interior.

A planar drive system includes at least one stator module, the stator module comprising at least one stator assembly having at least one coil arrangement. The coil arrangement may be energized and is set up to generate a stator magnetic field above a stator surface due to the energizing. The planar drive system further comprises a rotor. The rotor may be moved with the aid of an interaction between the stator magnetic field and a rotor magnetic field of the magnet arrangement above the stator surface. The planar drive system further comprises a separating device, wherein the separating device is arranged above the stator surface. The stator module is arranged on a first side of the separating device and the rotor is arranged on a second side of the separating device.

The separating device is advantageous if the rotor is to be used in an aggressive environment or in a sensitive environment. If the rotor is to be used in an aggressive environment, the separating device may be used to spatially separate the aggressive environment from the stator module and thus to prevent damage to the stator module. If the rotor is to be used in a sensitive area, the separating device may be used to ensure that the stator assembly may be arranged outside of the sensitive area and that any outgassing of the stator assembly does not lead to contamination of the sensitive area. This makes it particularly possible to use the rotor in a clean room or a vacuum.

In an embodiment, the separating device is non-magnetic. As the separating device is non-magnetic, the stator magnetic field on the second side may interact with the rotor and is not completely shielded by the separating device.

In an embodiment of the planar drive system, the separating device has a relative magnetic permeability of less than ten, in particular of less than two, and preferably of less than 1.01. Thus, the separating device is diamagnetic or paramagnetic and the stator magnetic field may interact with the rotor on the second side and is not completely shielded by the separating device.

In an embodiment of the planar drive system, the separating device has a thickness between 0.5 and 1 mm. On the one hand, this allows for safely separating the stator module from the aggressive medium or the sensitive area and further for not completely shielding the stator magnetic field by the separating device, even if the separating device is non-metallic.

In an embodiment of the planar drive system, the separating device is part of an operating housing. The rotor may be moved within the operating housing.

The operating housing may e.g. include a liquid tank. The liquid tank may consist of the separating device and side walls and be open at the top. Alternatively, the liquid tank may also be completely closed. In this manner, it may be achieved that the stator module may be arranged outside of the liquid tank and thus the stator module itself does not have to be embodied to be fluid-tight. In this case, the operating housing may be embodied to be fluid-tight.

The operating housing may also enclose a clean room and thus also be embodied to be fluid-tight. In this case, too, the stator module may be arranged outside of the clean room, thus preventing contamination from the stator module inside the clean room.

In an embodiment of the planar drive system, the operating housing comprises a first vacuum chamber. Thus, the rotor may be moved within the first vacuum chamber and the stator module is separated from the first vacuum chamber with the aid of the separating device. Thus, outgassing of components of the stator module cannot affect a vacuum quality within the first vacuum chamber.

In an embodiment of the planar drive system, the stator module is arranged within a second vacuum chamber. The separating device separates the first vacuum chamber from the second vacuum chamber. This embodiment is particularly advantageous because the separating device may have a relatively thin embodiment, with a thickness between 0.5 and 1 mm as described above in a preferred embodiment. If only the first vacuum chamber was provided, the negative pressure present in the first vacuum chamber would possibly cause the separating device to collapse into the first vacuum chamber and be damaged as a result. If the stator module is arranged in the second vacuum chamber and the second vacuum chamber is separated from the first vacuum chamber with the aid of the separating device, both the first vacuum chamber and the second vacuum chamber may be evacuated. The forces then acting upon the separating device are significantly smaller, so that on the one hand outgassing of components of the stator module into the first vacuum chamber and on the other hand damage to the separating device may be prevented.

In an embodiment of the planar drive system, an equalizing valve is arranged between the first vacuum chamber and the second vacuum chamber. The equalizing valve is arranged to equalize a pressure difference between the first vacuum chamber and the second vacuum chamber if the pressure difference is larger than 5 mbar. The preferred material thickness of the separating device described above is stable up to a pressure difference of 5 mbar in any case. The equalizing valve may compensate for a sudden pressure difference and thus prevent damage to the separating device.

In an embodiment of the planar drive system, the equalizing valve is embodied as a pressure relief valve. In an embodiment of the planar drive system, the equalizing valve is embodied as a controlled valve. A valve control is connected to a first pressure sensor of the first vacuum chamber and to a second pressure sensor of the second vacuum chamber. With the aid of the first pressure sensor, the internal pressure of the first vacuum chamber may be measured. With the aid of the second pressure sensor, the internal pressure of the second vacuum chamber may be measured. If this internal pressure differs by more than 5 mbar, the controlled valve may be opened and pressure may be equalized between the first vacuum chamber and the second vacuum chamber.

In an embodiment, the stator module is connected to a vacuum duct. The vacuum duct is arranged to provide a data connection and a current connection for the stator module from outside of the second vacuum chamber.

In an embodiment of the planar drive system, the vacuum duct comprises a printed circuit board. The printed circuit board is part of a wall of the second vacuum chamber. The printed circuit board further comprises pins for current feedthrough and vias for data connection. For this purpose, the printed circuit board may e.g. comprise a corresponding socket on both sides, wherein the individual connections of the respective sockets are connected with the aid of vias and a conventional network cable is used inside of the second vacuum chamber to connect the socket inside of the second vacuum chamber to the stator module and a conventional network cable is used outside of the second vacuum chamber to connect the socket to a controller. The pins for the current feed-through in this context have a thicker embodiment in order to be able to provide the currents necessary for generating the stator magnetic field.

In an embodiment, a thermal connection is established between the stator module and a wall of the second vacuum chamber to dissipate waste heat from the stator module.

In an embodiment of the planar drive system, the first vacuum chamber may be evacuated with the aid of a backing pump and a turbopump. In particular, it may be provided that the backing pump is connected to the turbopump and to the second vacuum chamber, and the turbopump is connected to the first vacuum chamber. If the backing pump is activated, the backing pump evacuates both the first vacuum chamber and the second vacuum chamber. If the vacuum in the first vacuum chamber and the second vacuum chamber is less than 5 mbar, the turbopump connected to the first vacuum chamber may then be activated. Thus, an ultra-high vacuum may be generated within the first vacuum chamber with the aid of the turbopump. Only the vacuum of the backing pump is present in the second vacuum chamber. In spite of the resulting pressure difference, the separating device is stable enough to withstand this pressure difference, thus providing an efficient system for a planar drive system having rotors to be operated in vacuum.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
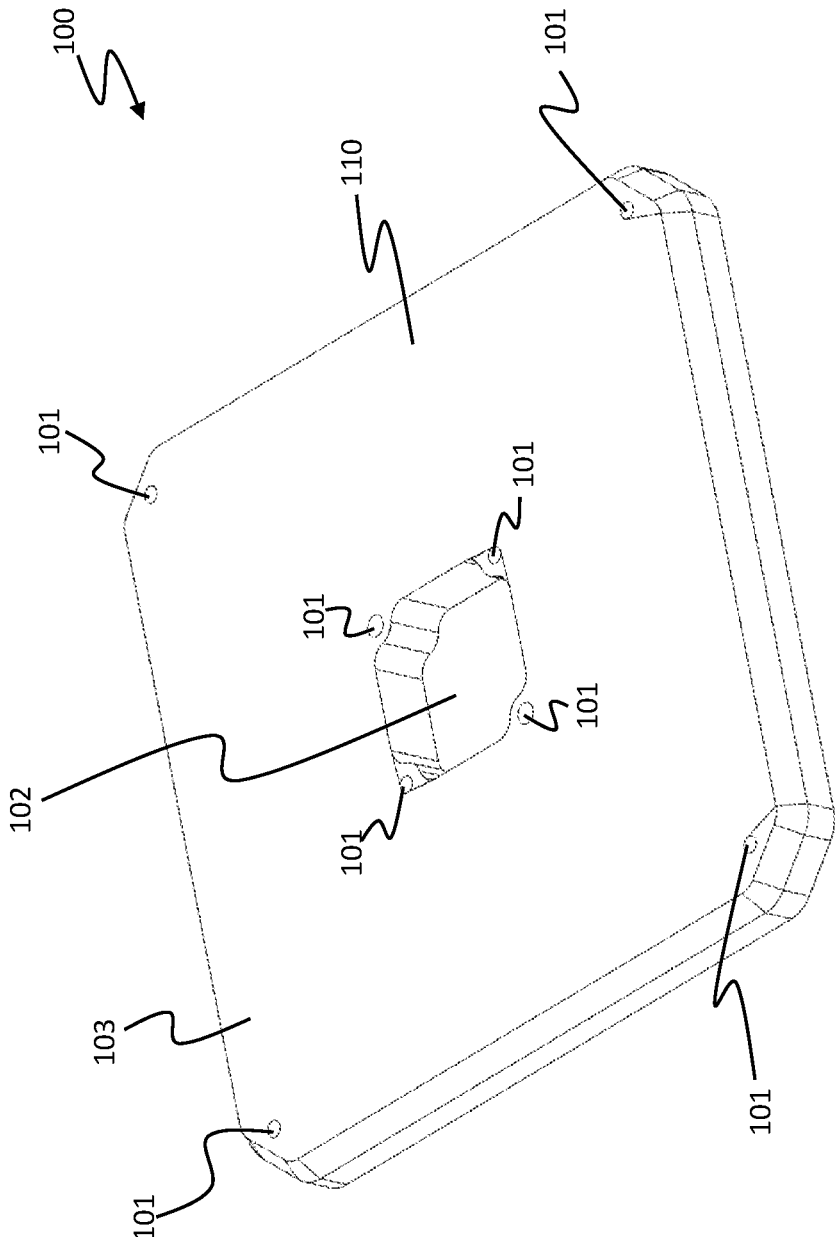
FIG. 1 shows an isometric view of a rotor.

FIG. 1 shows an isometric view of a rotor 100 having a housing 110. The housing 110 includes mounting devices 101 to which a payload of the rotor 100 may be attached. For this purpose, the mounting devices 101 may include blind holes or threaded holes to lock or bolt the payload to the rotor 100. The housing 110 further includes a through hole 102 in its center. The rotor 100 is shown in FIG. 1 in such a way that a top surface 103 of the rotor is visible and a bottom surface of the rotor 100 opposite the top surface 103 is not visible. As an alternative to the illustration of FIG. 1, it is also possible to embody the rotor 100 without the through hole 102. Furthermore, the mounting devices 101 may also be arranged differently or omitted completely.

The rotor 100 is set up to be operated in a planar drive system. The planar drive system may comprise stator modules, each of which is capable of generating a stator magnetic field and interacting with magnet arrangements arranged in the rotor 100. As a result, the rotor 100 may be moved as part of a planar drive system.

Figure 2:
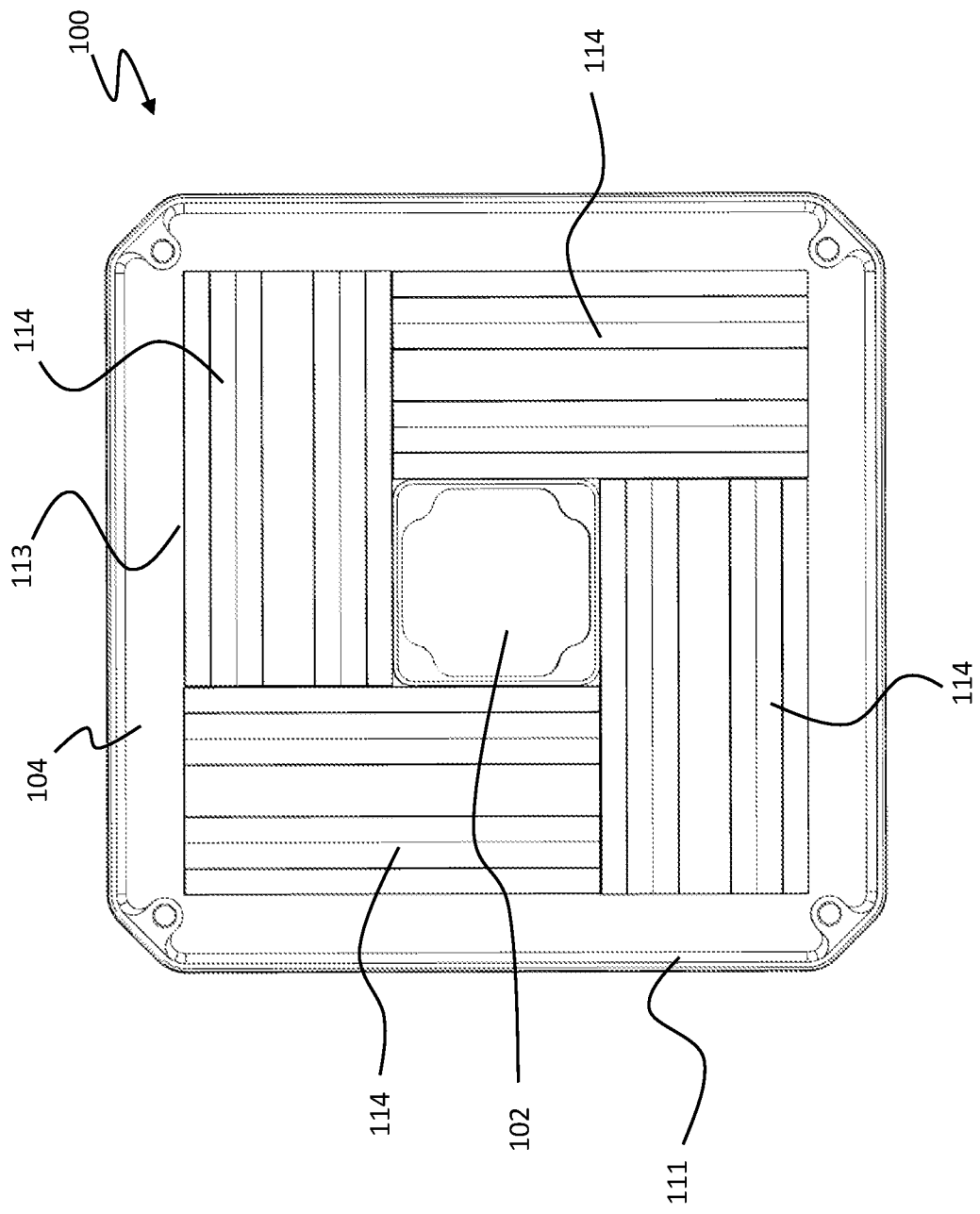
FIG. 2 shows a bottom view of the rotor of FIG. 1 prior to the attachment of a cover.

FIG. 2 shows a view of an underside 104 of the rotor 100 of FIG. 1. The rotor 100 comprises a basic housing body 111. Starting from the underside 104, the basic housing body 111 comprises a recess 113 in which four magnet arrangements 114 are arranged. The magnet arrangements 114 are embodied as so-called Halbach arrays having a total of five differently magnetized areas. The four magnet arrangements 114 are arranged circumferentially around the recess 102. The arrangement of the magnet arrangements 114 may also be configured differently than shown in FIG. 2. In particular, the number of magnet arrangements 114 may be other than four and, in particular, only one magnet arrangement 114 may be provided. Furthermore, the magnet arrangements 114 may vary in their geometric dimensions. By varying the size of the magnet arrangements 114, the size of the rotor 100 may be varied.

If the rotor 100 as shown in FIGS. 1 and 2 is to be used in an aggressive medium or in a sensitive area, an aggressive medium may attack the magnet arrangements 114 or an adhesive with the aid of which the magnet arrangements 114 are glued within the recess 113. Furthermore, if the rotor 100 is to be moved in a sensitive area, the magnet arrangements 114 or the adhesive used to secure the magnet arrangements 114 may outgas, contaminating the sensitive area. The sensitive area may be a clean room or a vacuum. In order to solve this problem, the rotor 100 may be sealed with a cover in a fluid-tight manner.

Figure 3:
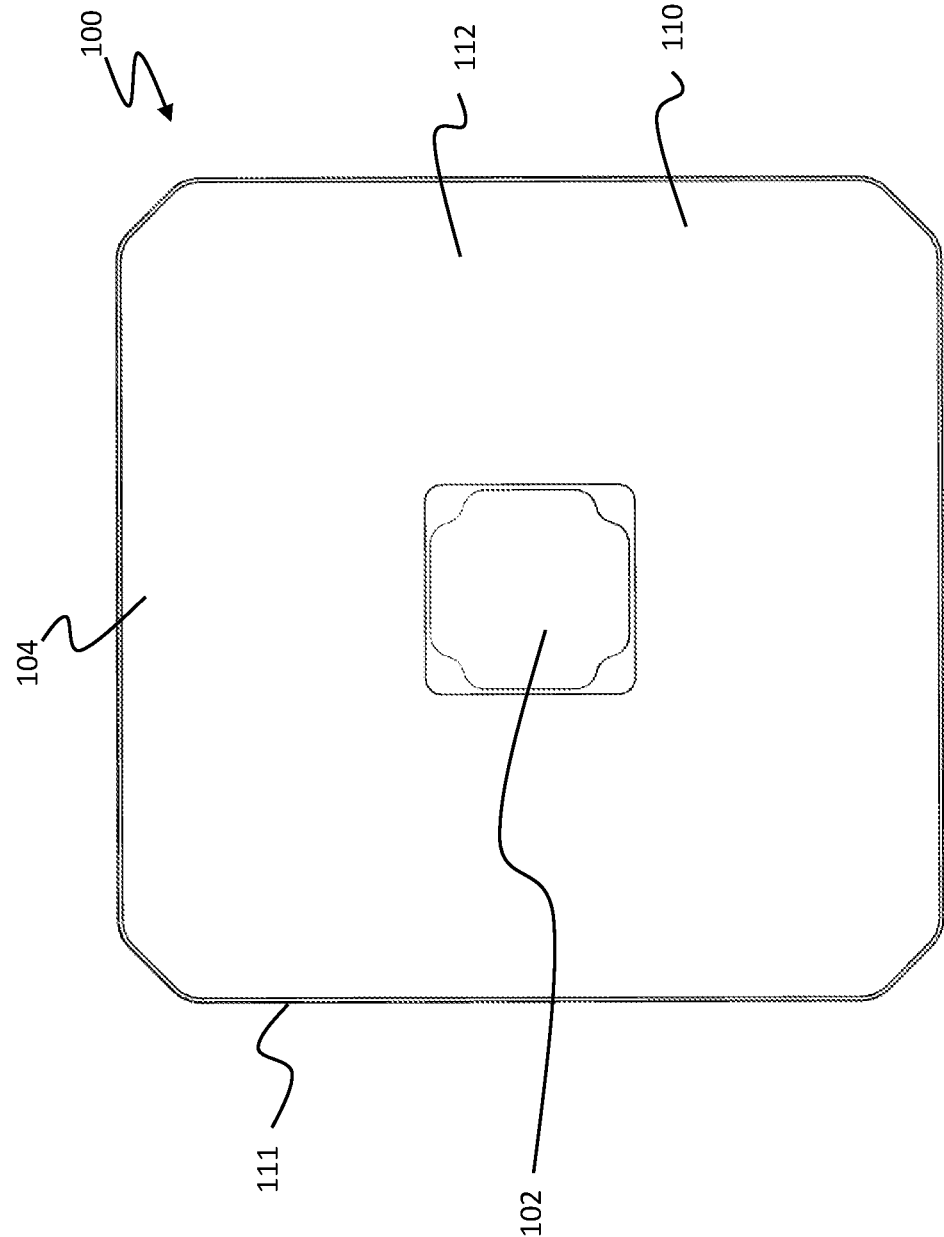
FIG. 3 shows the rotor of FIGS. 1 and 2 after the cover has been attached.

FIG. 3 shows a view of the underside 104 after a cover 112 has been fitted. With the aid of the cover 112, which like the basic housing body 111 is part of the housing 110, the rotor 100 may be sealed in a fluid-tight manner. Thus, the housing 110 is embodied to be fluid-tight.

Thus, the rotor 100 for a planar drive system comprises a housing 110 and at least one magnet arrangement 114. The housing 110 comprises a basic housing body 111 and a cover 112. The magnet arrangement 114 is arranged in a recess 113 of the basic housing body 111. The cover 112 is attached to the basic housing body 114 such that the housing 110 is configured to be fluid-tight, the cover 112 covers the recess 113, and the magnet arrangement 114 is arranged in an interior of the fluid-tight housing 110.

The cover 112 may be configured such that a magnetic field of the magnet arrangements 114 is available outside of the housing 110. This means that a magnetic field of the magnet arrangements 114 is also available outside of the rotor 100 for driving the rotor 100 within a planar drive system, and the magnetic field of the magnet arrangement 114 is not completely shielded by the cover 112.

By rendering the housing 110 fluid-tight with the aid of the cover 112, it may be achieved—when using the rotor 100 in an aggressive environment—that a liquid such as, for example, water, an acid, an alkali or an organic solvent may no longer attack the magnet arrangement 114 or the adhesive used to fix the magnet arrangement 114 within the rotor 100. If the rotor 100 is used in a sensitive area, such as a clean room or vacuum, it may be achieved that neither the magnet arrangement 114 nor the adhesive used to attach the magnet arrangement 114 may cause contamination.

In particular, the cover 112 may be non-magnetic. Furthermore, the cover 112 may be paramagnetic or diamagnetic and have a relative magnetic permeability of less than ten, in particular of less than two and preferably of less than 1.01.

Figure 4:
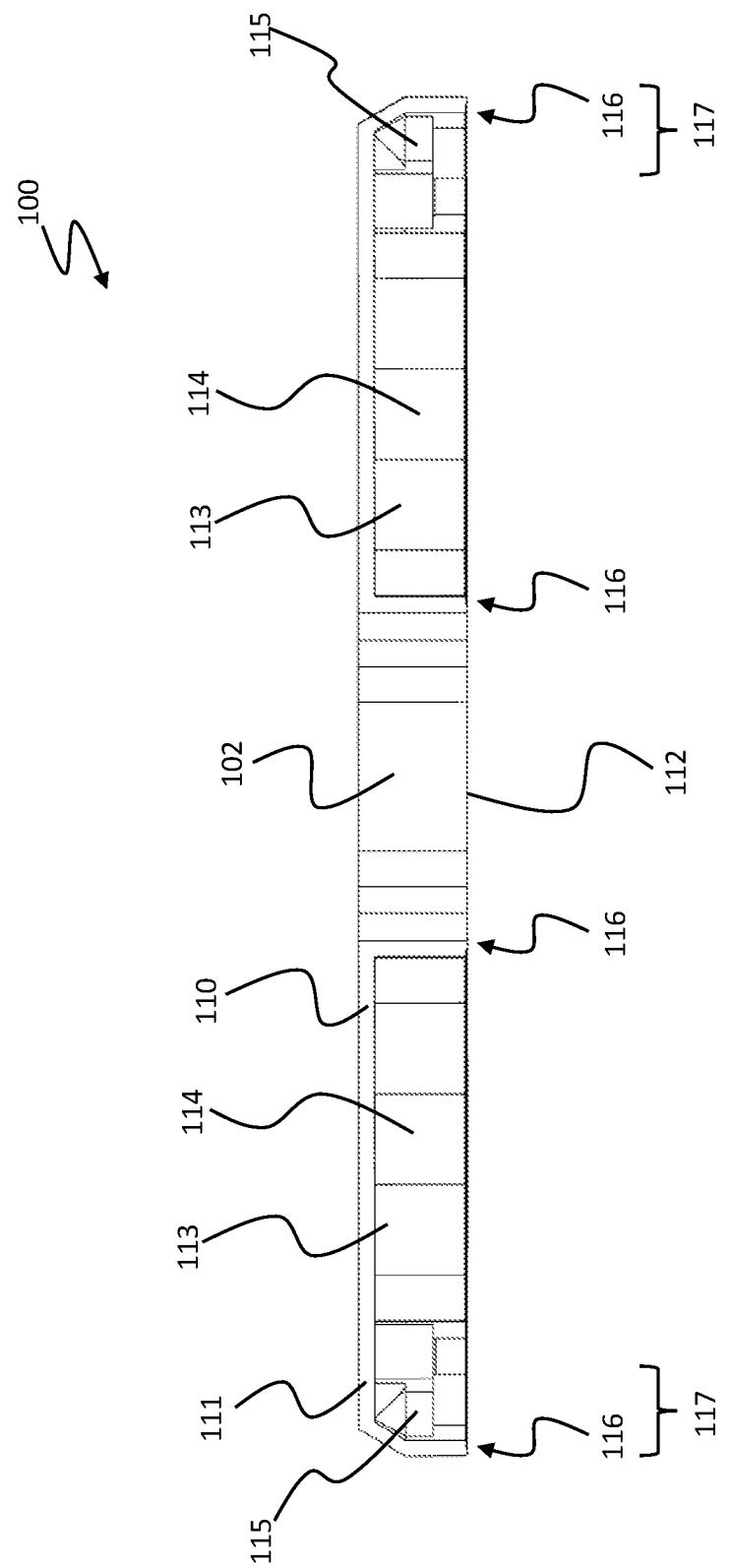
FIG. 4 shows a cross-section through the rotor of FIGS. 1 to 3.

FIG. 4 shows a cross-sectional view of the rotor 100 of FIGS. 1 to 3 after the cover 112 has been fastened to the basic housing body 111. An interior 115 of the housing 110 is sealed in a fluid-tight manner with the aid of the cover 112. The magnet arrangements 114 are arranged in the interior 115 of the housing 110.

In an embodiment, the cover 112 attenuates a magnetic field of the magnet arrangement 114 outside of the housing 110 by a maximum of 25%. In particular, the cover 112 attenuates the magnetic field of the magnet arrangement 114 by a maximum of 10%. Particularly preferred is a cover 112 that substantially does not attenuate the magnetic field of the magnet arrangement 114 at all, i.e., by 1% at most. Such a rotor 100 may be well used for a planar drive system 1.

In an embodiment, the basic housing body 111 and the cover 112 have a metallic embodiment. The cover 112 and the basic housing body 111 are laser-welded. The basic housing body 111 and the cover 112 may be made of stainless steel, for example.

In an embodiment, a laser-welded joint 116 is circumferentially disposed between the basic housing body 111 and the cover 112 in an edge region 117 of the housing 111. This laser-welded joint 116 may circumferentially extend around the entire housing 110 of the rotor 100. Furthermore, it is also shown in FIG. 4 that a laser-welded joint 116 is also implemented in the region of the through-hole 102 to connect the cover 112 to the basic housing body 111 in the region of the through-hole 102, as well.

Figure 5:
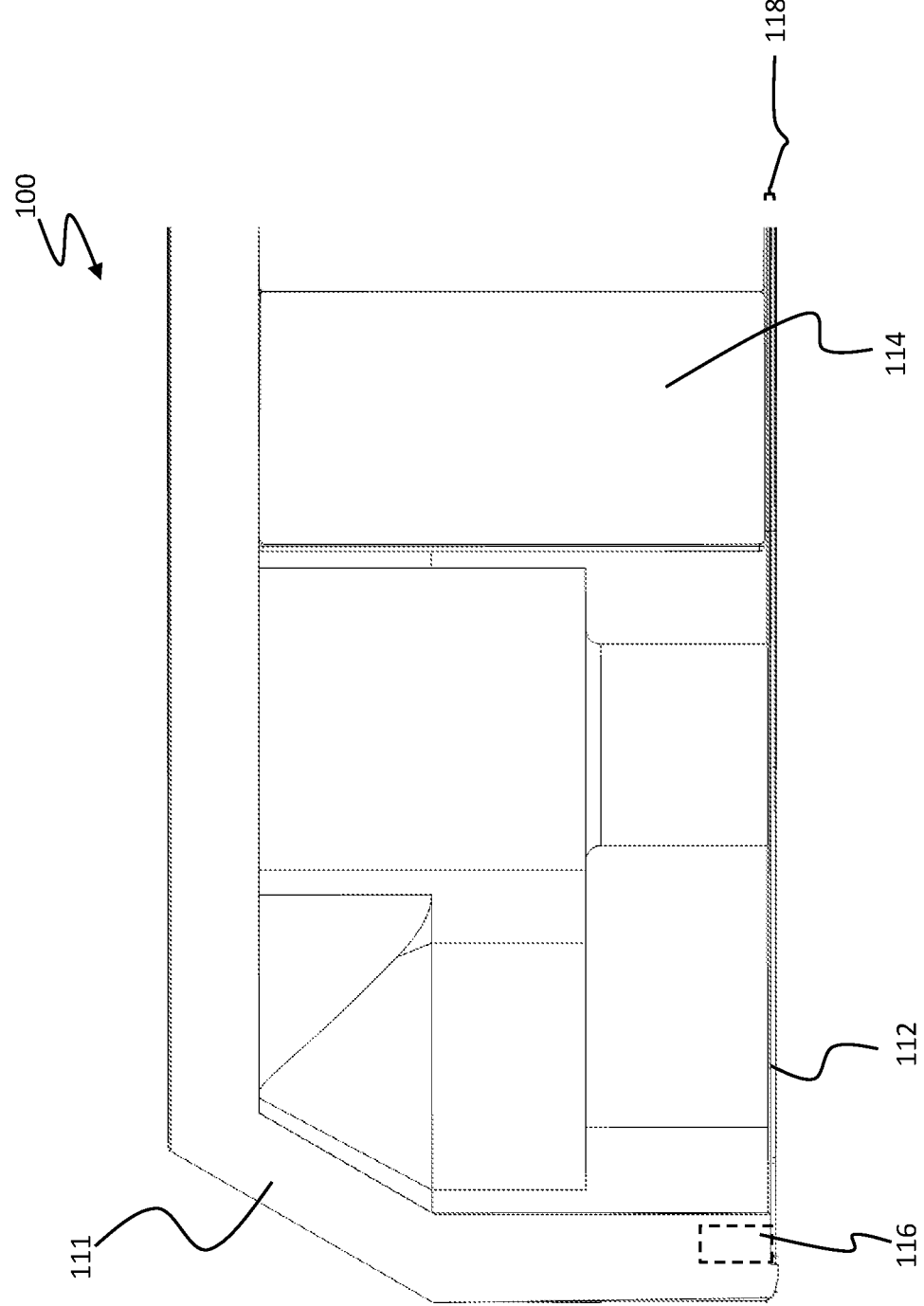
FIG. 5 shows an enlarged view of a laser welding area of the rotor of FIGS. 1 to 4.

FIG. 5 shows an enlarged view of the laser-welded joint 116. The cover 112 is laser-welded to the basic housing body 111. This is done by directing a laser at the cover 112, thereby creating a fusion zone within the cover 112 and the basic housing body 111. A mixture of the material of the basic housing body 111 and the cover 112 is arranged in the area of the laser-welded joint 116, which is shown as a dashed line in FIG. 5, the mixture being formed by the laser melting the material of the basic housing body 111 and the cover 112, and the melt solidifying again after the laser is switched off, thereby forming a fluid-tight joint between the basic housing body 111 and the cover 112. Attaching the cover 112 to the basic housing body 111 with the aid of a laser welding process is technically advantageous, since a magnetic field of the magnet arrangement 114 has no influence on the laser radiation. If an electrofusion joint were formed, the electrons used in the process would be deflected accordingly by the magnetic field of the magnet arrangement 114, and thus a fluid-tight housing 110 could not be reliably produced.

In an embodiment, the cover 112 comprises a metal sheet. A metal sheet thickness 118, that is, a thickness of the metal sheet of the cover 112 is between 0.05 and 0.5 mm. Preferably, the metal sheet thickness 118 is between 0.09 and 0.11 mm, and in particular 0.1 mm.

Figure 6:
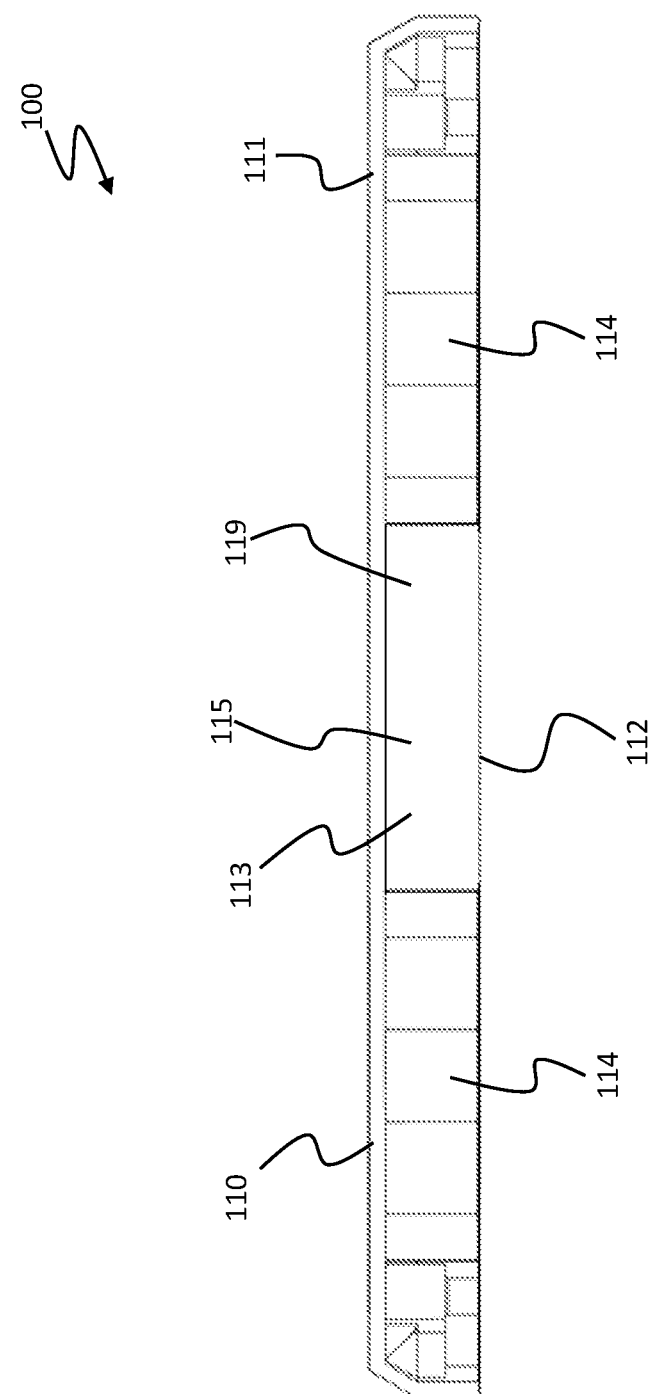
FIG. 6 shows a cross-section through a further rotor.

FIG. 6 shows a cross-section through a further rotor 100, which is essentially embodied as the rotor described in FIGS. 1 to 5. Merely the through hole 102 is not provided, with the recess 113 extending over the entire basic housing body 111 and the magnet units 114 being arranged in the recess 113. An interior 115 of the housing 110 is arranged between the magnet units 114, which is separated from an environment of the rotor 100 in a fluid-tight manner with the aid of the cover 112. In order to use such a rotor 100 as shown in FIG. 6, it may be advantageous to either at least partially evacuate the interior 115 of the rotor, in particular if the rotor 100 is to be used in a vacuum, or it may be provided to arrange a casting compound 119 in the interior 115 of the housing 110 and thus avoid cavities within the housing 110. In an embodiment, the casting compound 119 is a PU casting compound, wherein the interior 115 of the fluid-tight housing 110 is poured with the PU casting compound in a bubble-free manner. By casting with the aid of the casting compound 119, it may be achieved, for example, that if the rotor 100 is to be used in a vacuum, there are no air-filled cavities within the rotor 100 and thus, if the environment of the rotor 100 is evacuated, there is no overpressure within the rotor 100 which could possibly cause the cover 112 to burst. In particular, the casting compound 119 may be used to seal further cavities of the basic housing body 110, for example adjacent to the magnet arrangements 114.

Figure 7:
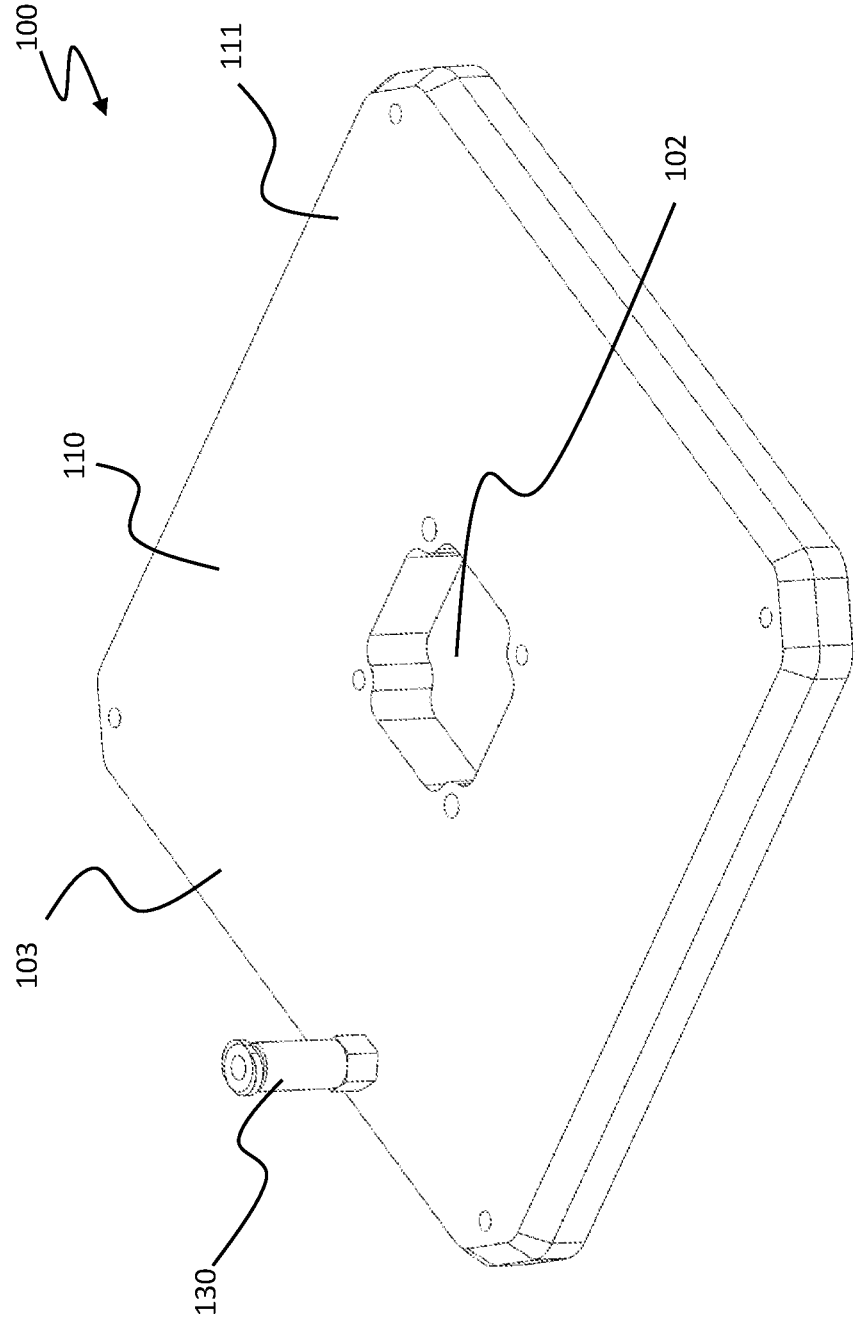
FIG. 7 shows an isometric view of a further rotor.

FIG. 7 shows an isometric view of a further rotor 100, wherein the rotor 100 of FIG. 7 corresponds to the rotor 100 of FIG. 1, unless differences are described in the following. The rotor 100 comprises a fluid-tight housing 110, which may be configured as described in FIGS. 1 to 5. Furthermore, as shown in FIG. 6, the through hole 102 may be omitted. The rotor 100 further comprises an evacuating device 130 fastened to the housing 110. With the aid of the evacuating device 130, a negative pressure may be generated within the housing 110. Thus, the fluid-tight housing 110 may be evacuated at least partially, in particular completely. The evacuating device 130 may in this context comprise a welded or soldered pipe or be in the form of a valve. In particular, a pump may be connected to the evacuating device 130 to at least partially evacuate the interior 115 of the housing 110. In particular, evacuating the interior 115 of the housing 110 is possible both for rotors 100 cast with a casting compound 119 and for rotors 100 without a casting compound 119.

Figure 8:
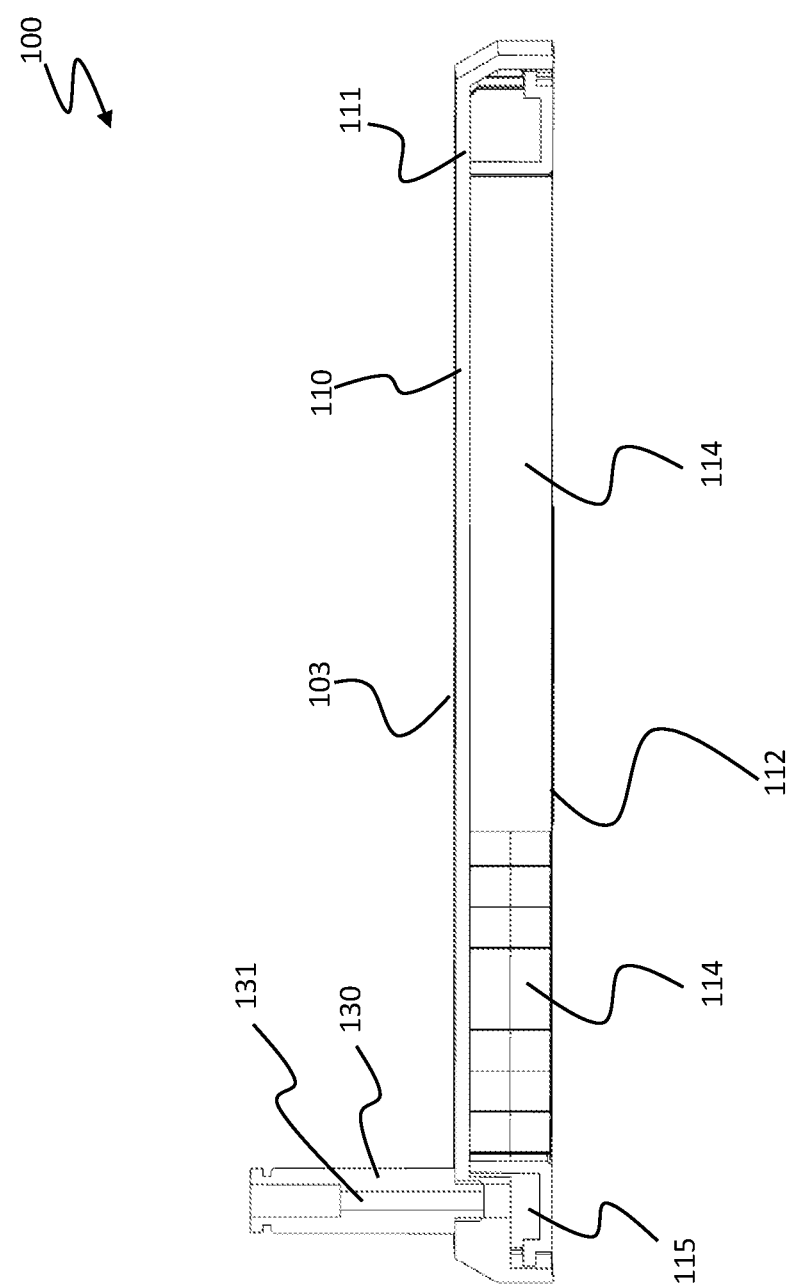
FIG. 8 shows a cross-section through the rotor of FIG. 7.

FIG. 8 shows a cross-sectional view of the rotor 100 of FIG. 7. The evacuating device 130 includes a pipe 131 that extends to the interior 115 of the housing 110. With the aid of the pipe 131, the interior 115 of the housing 110 may be evacuated. After evacuating, the pipe 131 may be soldered or welded so that a negative pressure is permanently present within the housing 110.

In this regard, the evacuating device 130 of the embodiment of FIGS. 7 and 8 is arranged on the upper side 103 of the rotor, although other positions for arranging the evacuating device 130 may alternatively be provided.

Figure 9:
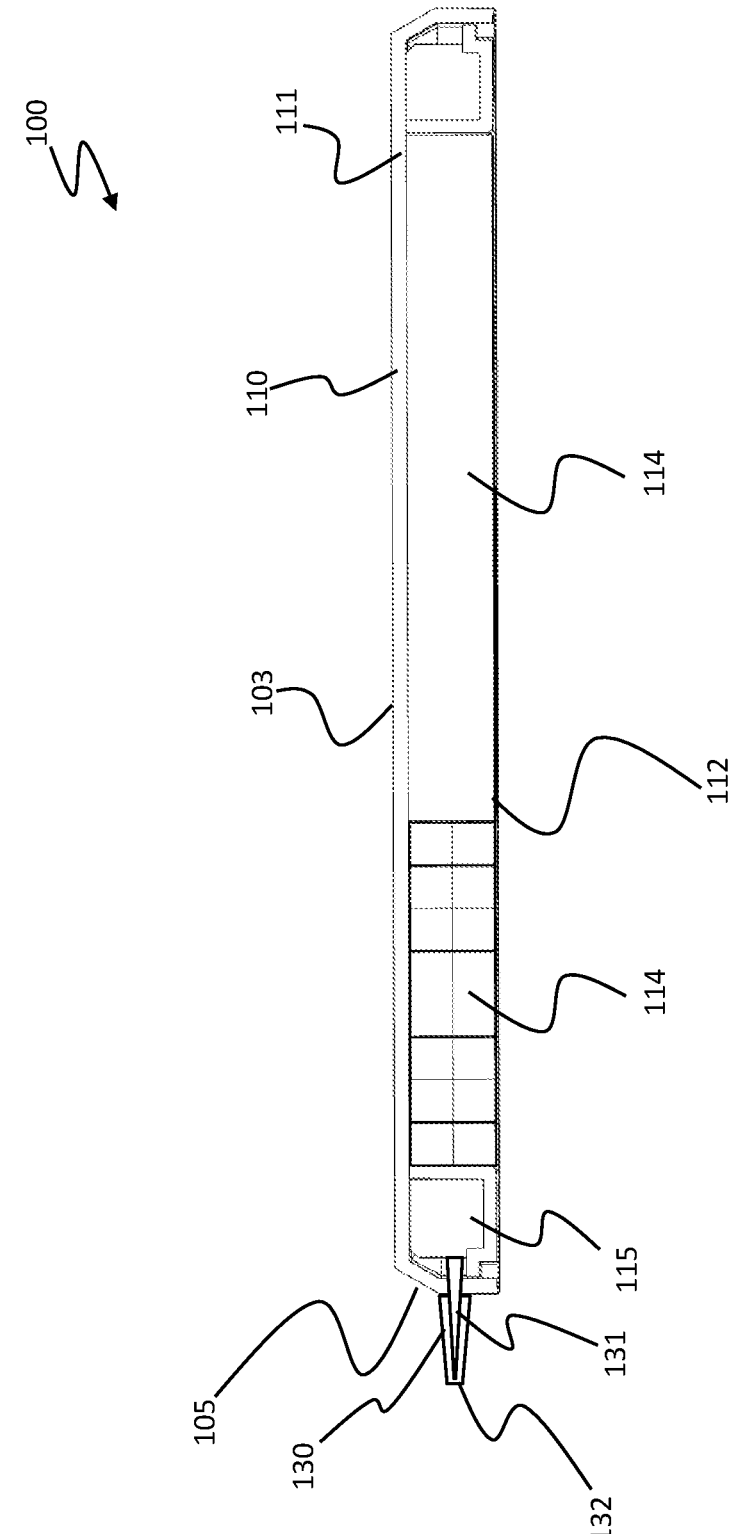
FIG. 9 shows a cross-section through a further rotor.

FIG. 9 shows a cross-section through a further embodiment of a rotor 100 corresponding to the rotor of FIGS. 7 and 8, unless differences are described below. In this embodiment, the evacuating device 130, again embodied as a pipe 131, is arranged on a side surface 105 of the rotor 100. A soldered region 132 is embodied to close the pipe 131 after evacuation. Similarly, a welded area may be embodied, as well.

Figure 10:
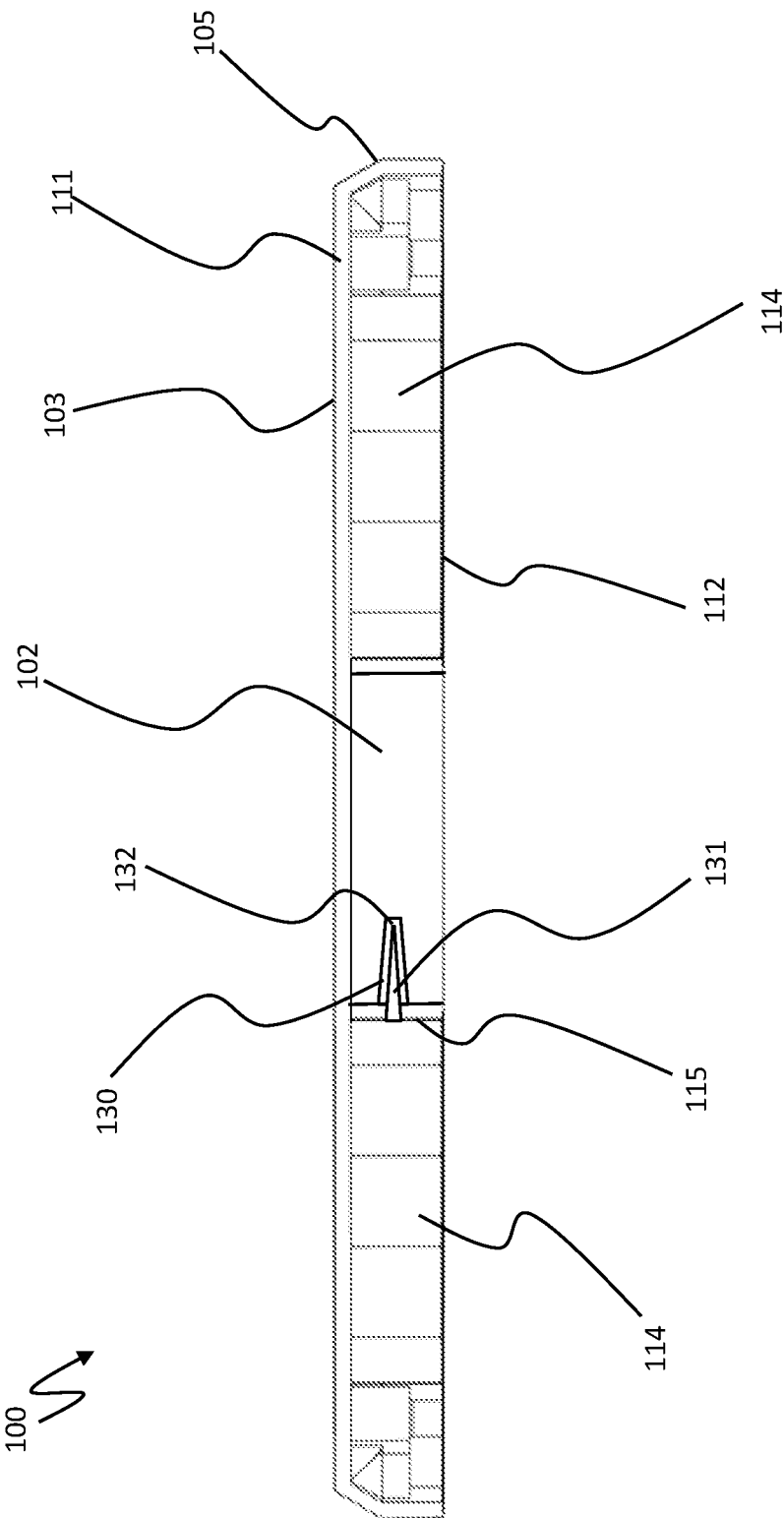
FIG. 10 shows a cross-section through a further rotor.

FIG. 10 shows a cross-sectional view of a further embodiment of a rotor 100 corresponding to the rotor of FIG. 9, unless differences are described below. In this embodiment, the rotor comprises the through hole 102 and the evacuating device 130, again embodied as a pipe 131, is arranged in the through hole 102 of the rotor 100. A soldered region 132 is embodied to close the pipe 131 after evacuation. Similarly, a welded area may be embodied, as well.

In an embodiment, it is provided that the interior 115 of the fluid-tight housing 110 is free of water. This makes it possible for the rotor 100, after being used in an aggressive environment, to be cleaned with the aid of water and, after cleaning with the aid of water, to be heated to above 100° C. for drying without the presence of water molecules in the interior 115 of the housing 110, which would change to the gaseous state during such heating and thus would possibly cause the cover 112 to burst.

In order to produce the rotor described in FIGS. 1 to 10, the method described below may be used. First, the basic housing body 111 with the recess 113 is provided. Then, the magnet arrangement is arranged in the recess 113. A plurality of magnet arrangements 114 may also be arranged, as shown in FIGS. 1 to 10. Adhesive may be used to secure the magnet arrangements 114 within the recess 113 of the basic housing body 111. Then, the cover 112 is attached to the basic housing body 111 in such a way that a housing 110 consisting of the basic housing body 111 and the cover 112 is embodied in a fluid-tight manner, and the magnet arrangement 114 is arranged in an interior 115 of the fluid-tight housing.

In an embodiment of the method, the basic housing body 111 and the cover 112 have a metallic embodiment. The cover 112 and the basic housing body 111 are laser-welded.

In order to be able to provide that the interior 115 of the housing 110 is free of water, it may be provided that the rotor 100 is in a vacuum during the attachment of the cover 112 and thus the interior of the fluid-tight housing is free of water. Furthermore, this methodology may also be used to simultaneously evacuate the interior 115 of the housing 110. Another alternative for producing the water-free interior 115 of the housing 110 is to heat the rotor 100 to more than 100° C. before and/or during the attachment of the cover 112, thereby evaporating all water from the basic housing body 111 and the magnet arrangement 114. Of course, these two variants may also be combined, for example, the rotor may first be heated to more than 100° C. and at the same time placed in a vacuum, and then the laser welding may be carried out within the vacuum at a temperature above or below 100° C.

Figure 11:
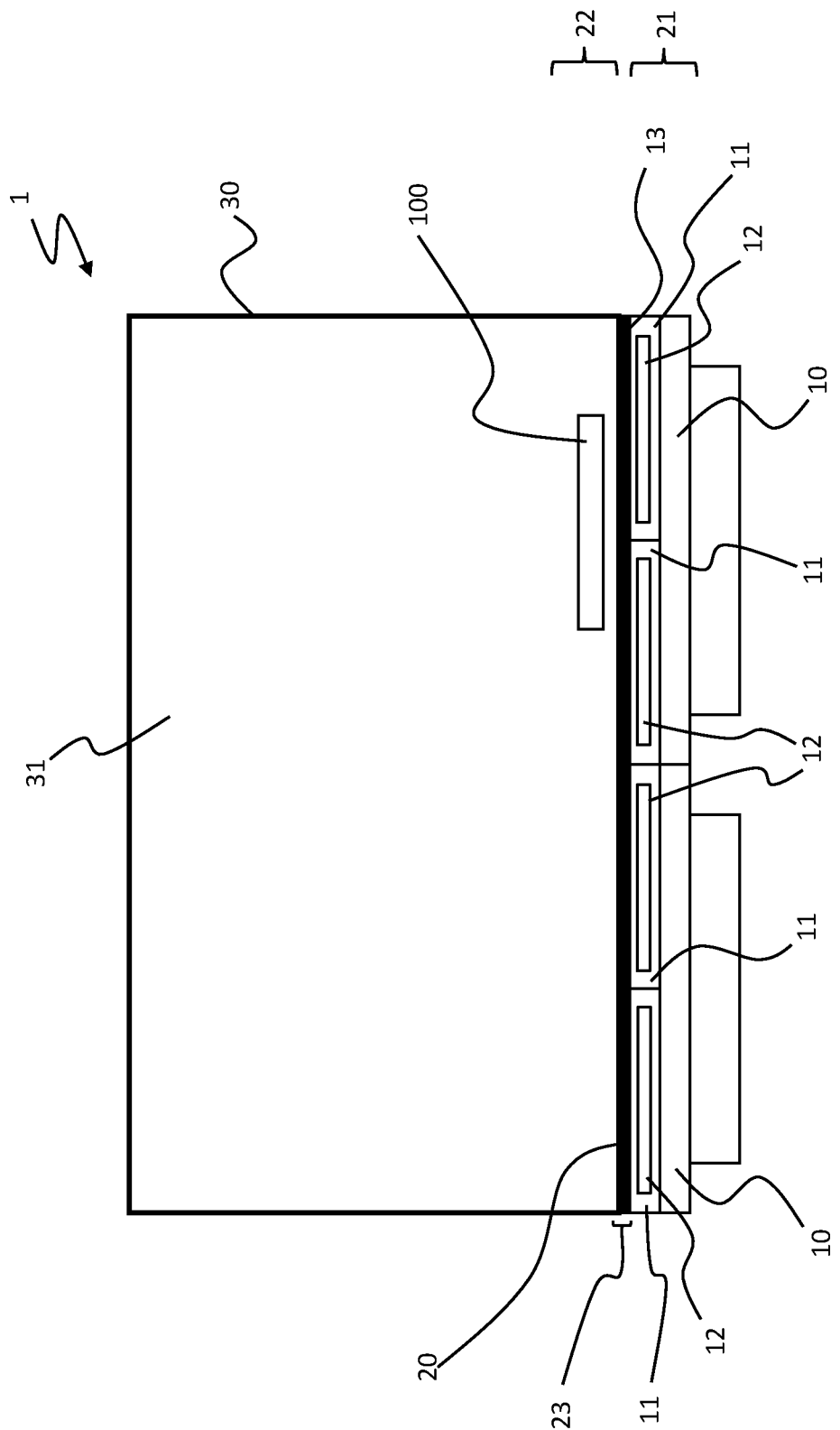
FIG. 11 shows a planar drive system.

FIG. 11 shows a cross-section of a planar drive system 1 having two stator modules 10, each comprising two stator assemblies 11. Each stator assembly 11 comprises at least one coil arrangement 12. The coil arrangements may each be energized and are set up to generate a stator magnetic field above a stator surface 13 due to energizing. The planar drive system 1 further comprises a rotor 100, which may be configured as described in connection with FIGS. 1 to 10. The rotor 100 may be moved above the stator surface 113 with the aid of an interaction between the stator magnetic field and a rotor magnetic field of the magnetic arrangements 114. The planar drive system further comprises a separating device 20. The separating device 20 is arranged above the stator surface 13, with the stator modules 10 arranged on a first side 21 of the separating device 20. The rotor 100 is arranged on a second side 22 of the separating device 20. The separating device 20 may have a non-magnetic embodiment. The separating device 20 may further have a relative magnetic permeability smaller than ten, in particular smaller than two and preferably smaller than 1.01 and thus be diamagnetic or paramagnetic.

FIG. 11 shows two stator modules 10. Of course, another number of stator modules 10 may be provided, e.g. one stator module 10 or more than two stator modules 10. Furthermore, only one rotor 100 is shown, however, a plurality of rotors 100 may be provided. Thus, in particular, the stator modules 10 and the rotor 100 are arranged on different sides 21, 22 of the separating device 20 so that the separating device 20 separates the rotor 100 from the stator modules 10. The stator magnetic field of the stator modules 10 may pass through the separating device 100 and thus interact with the rotor magnetic field of the magnetic arrangements 114 of the rotor 100 and thus drive the rotor 100 accordingly, in particular if the separating device 20 is non-magnetic, diamagnetic or paramagnetic.

In an embodiment, a thickness 23 of the separating device 20 is between 0.5 and 1 mm. The separating device 20 may, for example, be made of plastic, glass or have a metallic embodiment. In particular, if the separating device 20 is metallic, it may be made of stainless steel.

FIG. 11 also shows that the separating device 20 is part of an operating housing 30. The operating housing 30 comprises an inner area 31 in which the rotor 100 may be moved. In particular, the operating housing 30 may comprise a liquid tank, wherein in the inner area 31 of the operating housing 30 e.g. an aggressive liquid based on water, e.g. an acid or alkali, may be arranged, and this aggressive liquid cannot enter the interior of the rotor 100 through the fluid-tight housing 110 of the rotor 100, as described further above. An organic solvent may also be disposed in the inner area 31 of the operating housing 30. For this purpose, the operating housing 30 may be completely closed or may be open at the top.

Furthermore, the operating housing 100 may include a clean room area and thus the inner area 31 of the operating housing 30 may be configured with a predetermined clean environment. The separating device 20 separates the stator modules 10 from the inner area 31 of the operating housing 30, and contaminants from the stator modules 10 cannot enter the inner area 31 of the operating housing 30. Thus, it is possible for the rotor 100 to move in a clean room.

Figure 12:
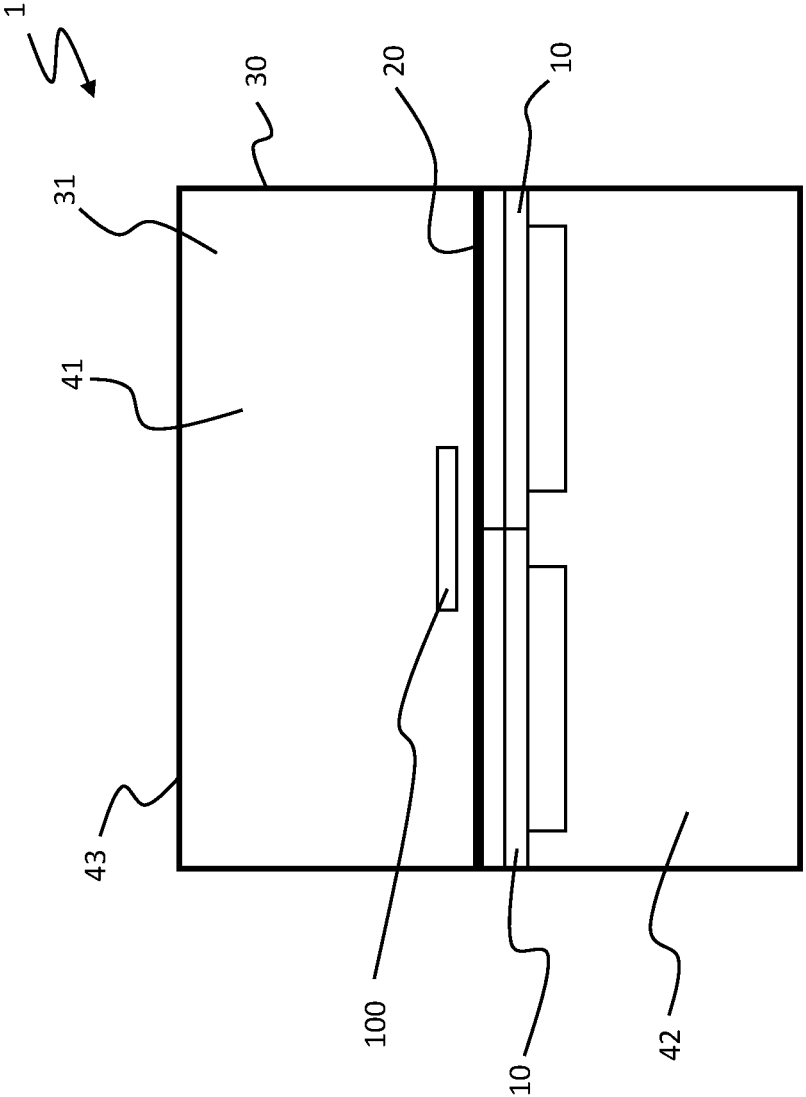
FIG. 12 shows a further planar drive system.

FIG. 12 shows a cross-sectional view of a further planar drive system 1, which is constructed like the planar drive system 1 of FIG. 11, unless differences are described in the following. The operating housing 30 includes a first vacuum chamber 41, so that the rotor 100 may be moved within the first vacuum chamber 41. The stator modules 10 are arranged outside of the first vacuum chamber 41.

Optionally, but also shown in FIG. 12, the stator modules 10 are arranged within a second vacuum chamber 42. The separating device 20 separates the first vacuum chamber 41 from the second vacuum chamber 42. A chamber wall 43 comprises both the first vacuum chamber 41 and the second vacuum chamber 42. This structure allows for a thin embodiment of the separating device 20, for example in the range between 0.5 and 1 mm thick. If only the first vacuum chamber 41 were provided, the separating device 20 could collapse into the first vacuum chamber 41 due to its thinness, as the case may be. By arranging the stator modules 20 in the second vacuum chamber 42, this may be prevented.

Consequently, this arrangement of the planar drive system 1 within the first vacuum chamber 41 and the second vacuum chamber 42 allows for a movement of the rotor 100 within a vacuum in the first vacuum chamber 41. This may be particularly advantageous if the planar drive system 1 is to be used to move substrates in a vacuum, e.g. when manufacturing semiconductors. By arranging the separating device 20 between the first vacuum chamber 41 and the second vacuum chamber 42, it may further be achieved that the separating device 20 has a smaller thickness than the chamber wall 43 without the risk of the separating device 20 collapsing into the first vacuum chamber 41.

Figure 13:
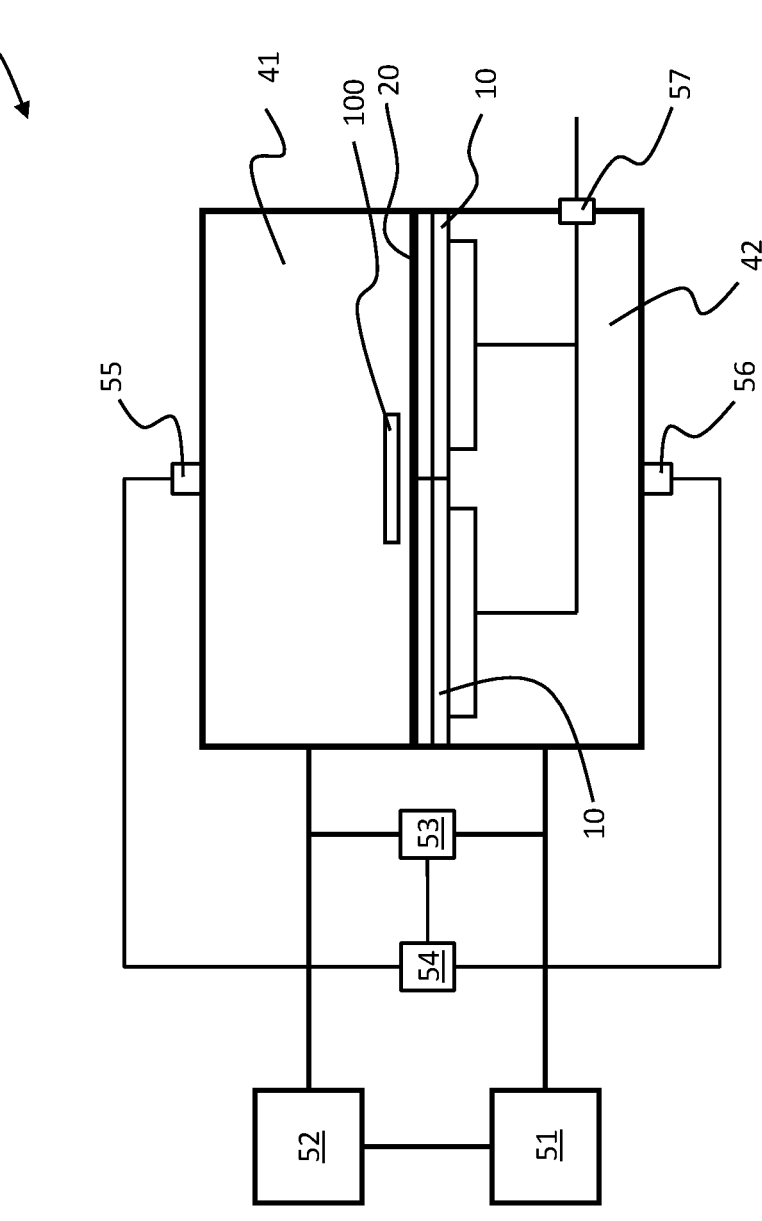
FIG. 13 shows a further planar drive system.

FIG. 13 shows a planar drive system 1 that corresponds to the planar drive system 1 of FIG. 12, but extends it by additional components. A backing pump 51 is connected to a turbopump 52. The backing pump 51 is further connected to the second vacuum chamber 42. The turbopump 52 is connected to the first vacuum chamber 41. If a vacuum is now intended to be provided within the first vacuum chamber 41 and the second vacuum chamber 42, the backing pump 51 may first be put into operation. This directly evacuates the first vacuum chamber 41 via the turbopump 52 and the second vacuum chamber 42. If the pressure within the first vacuum chamber 41 is sufficiently low, the turbopump 52 may additionally be put into operation to create an ultra-high vacuum within the first vacuum chamber 41. The second vacuum chamber 42 may not need to be evacuated with the aid of a turbopump, since the vacuum in the second vacuum chamber 42 serves only to prevent collapse of the separating device 20. Thus, the negative pressures achievable by the backing pump 51 are sufficient within the second vacuum chamber 42. Instead of the backing pump 51 and the turbopump 52, another system may also be used in general, in which both vacuum chambers 41, 42 are evacuated with the aid of a vacuum pump and the first vacuum chamber 41 is evacuated with the aid of a high-vacuum or ultra-high-vacuum pump. Furthermore, it may be provided that a further backing pump is used for evacuating the second vacuum chamber 42 and the backing pump 51 is not connected to the second vacuum chamber 42.

In an embodiment example which is also shown in FIG. 13, an equalizing valve 53 is arranged between the first vacuum chamber 41 and the second vacuum chamber 42. In the embodiment example of FIG. 13, the equalizing valve 53 is arranged between the connections of the vacuum pumps 51, 52 and the vacuum chambers 41, 42. The equalizing valve 53 is arranged to compensate for a pressure difference between the first vacuum chamber and the second vacuum chamber if the pressure difference is larger than 5 mbar.

In an embodiment, the equalizing valve 53 is embodied as a pressure relief valve. This pressure relief valve may e.g. have a diaphragm that ruptures in the event of an overpressure or a pressure difference of more than 5 mbar and thus ensures pressure compensation between the first vacuum chamber 41 and the second vacuum chamber 42.

The equalizing valve 53 may also be embodied as a controlled valve. In this case, a valve control 54 is connected to the equalizing valve 53 as well as to a first pressure sensor 55 of the first vacuum chamber 41 and a second pressure sensor 56 of the second vacuum chamber 42. The valve control 54 may be used to compare signals from the first pressure sensor 55 and the second pressure sensor 56, and if there is a pressure difference of more than 5 mbar, the equalization valve 53 may be opened accordingly to provide pressure equalization. Of course, another pressure difference may be selected, in which case the pressure difference may particularly be influenced by the stability of the separating device 20 and also by the thickness of the separating device 20.

A vacuum duct 57 is further arranged at the second vacuum chamber 42. The stator modules 10 are connected to the vacuum duct 57, wherein the vacuum duct 57 is set up to provide a data connection and a current supply to the stator modules 10 from outside of the second vacuum chamber 42.

Figure 14:
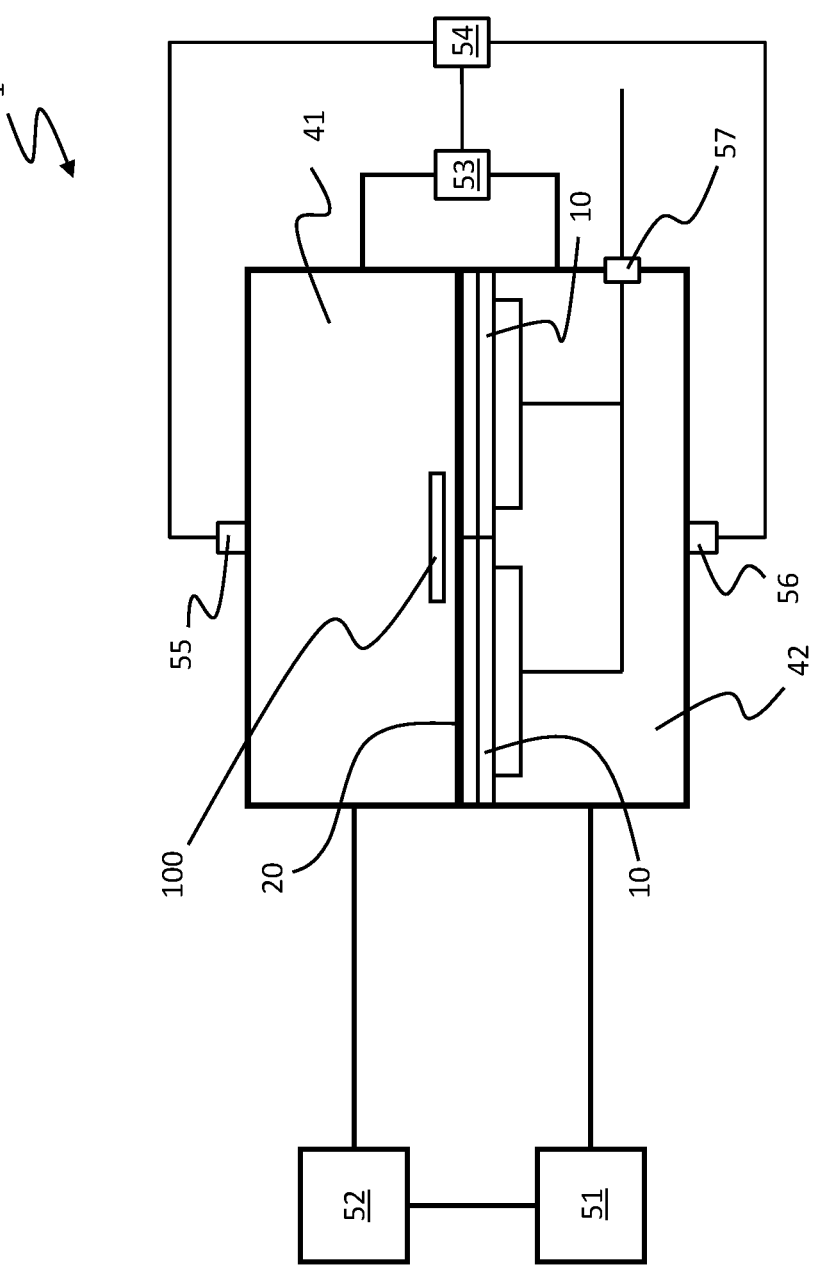
FIG. 14 shows a further planar drive system.

FIG. 14 shows a planar drive system 1 that corresponds to the planar drive system 1 of FIG. 13, provided that no differences are described in the following. In this embodiment example, only the equalizing valve 53 is connected to the first vacuum chamber 41 and to the second vacuum chamber 42 in a direct manner, and not via the connections to the vacuum pumps 51, 52.

Figure 15:
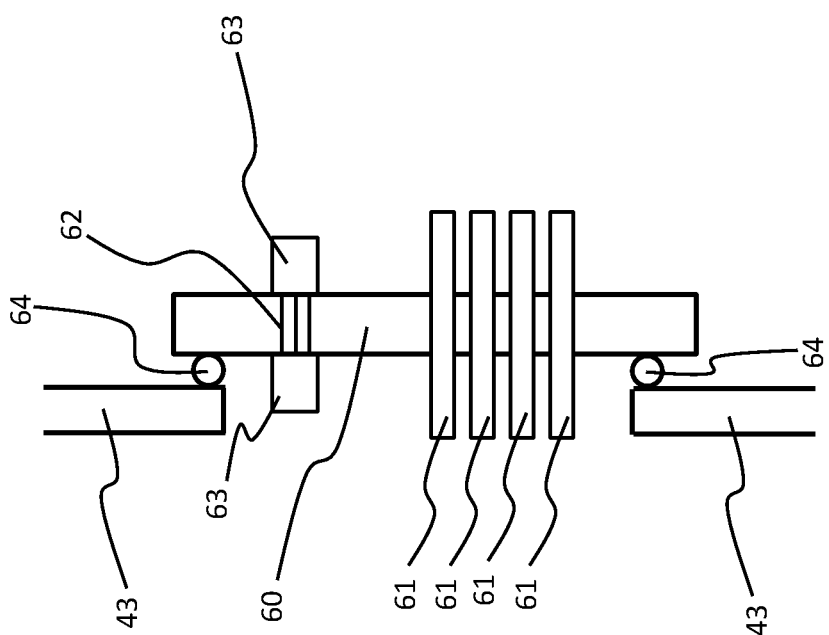
FIG. 15 shows a vacuum duct for a planar drive system.

FIG. 15 shows an enlarged schematic diagram of a vacuum duct 57. The vacuum duct 57 comprises a printed circuit board 60. The printed circuit board 60 has pins 61 for current feedthrough and vias 62 for data connection. The vias 62 are each connected to a socket 63 on both sides of the printed circuit board 60. With the aid of a seal 64, the printed circuit board 60 is attached to the chamber wall 43 and thus forms part of a chamber wall 43 of the second vacuum chamber 42. In particular, the printed circuit board 60 is thus part of a wall of the second vacuum chamber 42. The printed circuit board 60 and the seal 64 are arranged on a side of the chamber wall 43 facing away from the second vacuum chamber 42, since this arrangement allows for an automatic or assisted sealing due to the vacuum. Alternatively, however, it is also possible to arrange the printed circuit board 60 and the seal 64 on a side of the chamber wall 43 facing the second vacuum chamber 42. Conventional network cables may be plugged into the sockets 63 and used for data connection with the stator modules 10. With the aid of the pins 61, currents may be provided to supply currents to the stator modules 10. With the aid of such a vacuum duct 57 based on the printed circuit board 60, a vacuum duct may be provided that is easy to manufacture and meets the requirements for the vacuum within the second vacuum chamber 42, since an ultra-high vacuum is not required therein. Thus, conventional technology may be used for the vacuum duct 57 and the use of expensive ceramic feedthroughs is not mandatory.

Figure 16:
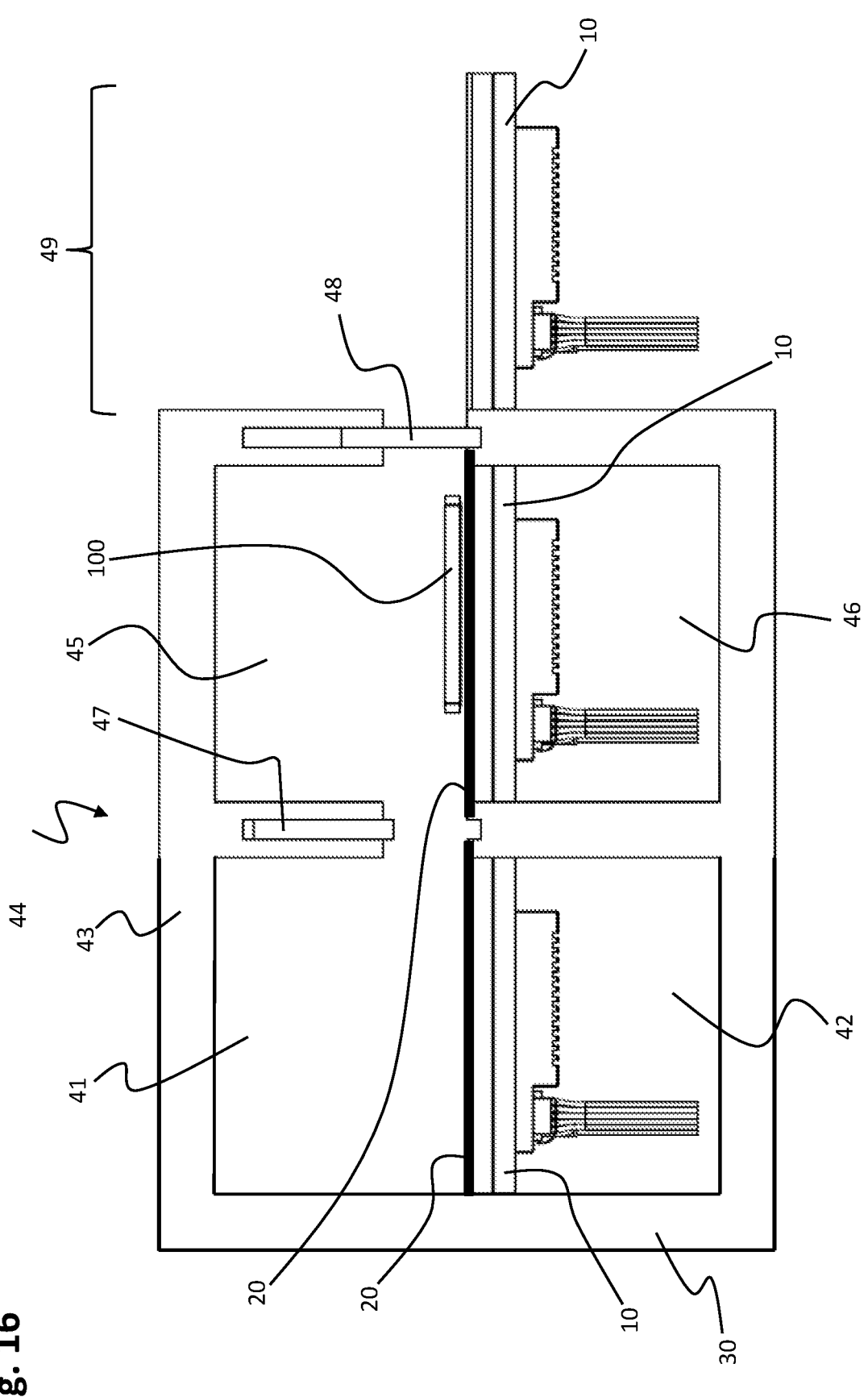
FIG. 16 shows a cross-section of a lock chamber for a planar drive system.

FIG. 16 shows a vacuum lock 44 that may be used to introduce a rotor 100 from outside of a vacuum within a vacuum. Three stator modules 10 are shown, one of the stator modules 10 being arranged in the second vacuum chamber 42 with a first vacuum chamber 41 above it and separated from it with the aid of the separating device 20. With the aid of a first gate 47, the first vacuum chamber 41 is separated from a third vacuum chamber 45. The third vacuum chamber 45 is separated with the aid of a separating device 20 from a fourth vacuum chamber 46, in which a stator module 10 is also arranged. With the aid of a second gate 48, the third vacuum chamber 45 is separated from an outer area 49 in which a stator module 10 is arranged, as well. A rotor 100 may be moved from the outer area 49 into the third vacuum chamber 45 when the first gate 47 between the first vacuum chamber 41 and the third vacuum chamber 45 is closed and the second gate 48 between the third vacuum chamber 45 and the outer area 49 is open. Now, the third vacuum chamber 45 and the fourth vacuum chamber 46 may be evacuated after the rotor 100 is moved into the third vacuum chamber 45 and the second gate 48 is closed. Then, the first gate 47 between the first vacuum chamber 41 and the third vacuum chamber 45 may be opened and the rotor 100 may be moved into the first vacuum chamber 41. The gaps that occur between the stator modules 10 in this process may be overcome by the rotor 100.

An analogous arrangement may also be provided if, instead of vacuum chambers, the operating housing 30 is to comprise a clean room. In this case, the lower areas for the stator modules do not have to be hermetically sealed, and it is sufficient to provide areas analogous to the first vacuum chamber 41 and to the third vacuum chamber 45 for introducing the rotor 100 into the clean room.

Figure 17:
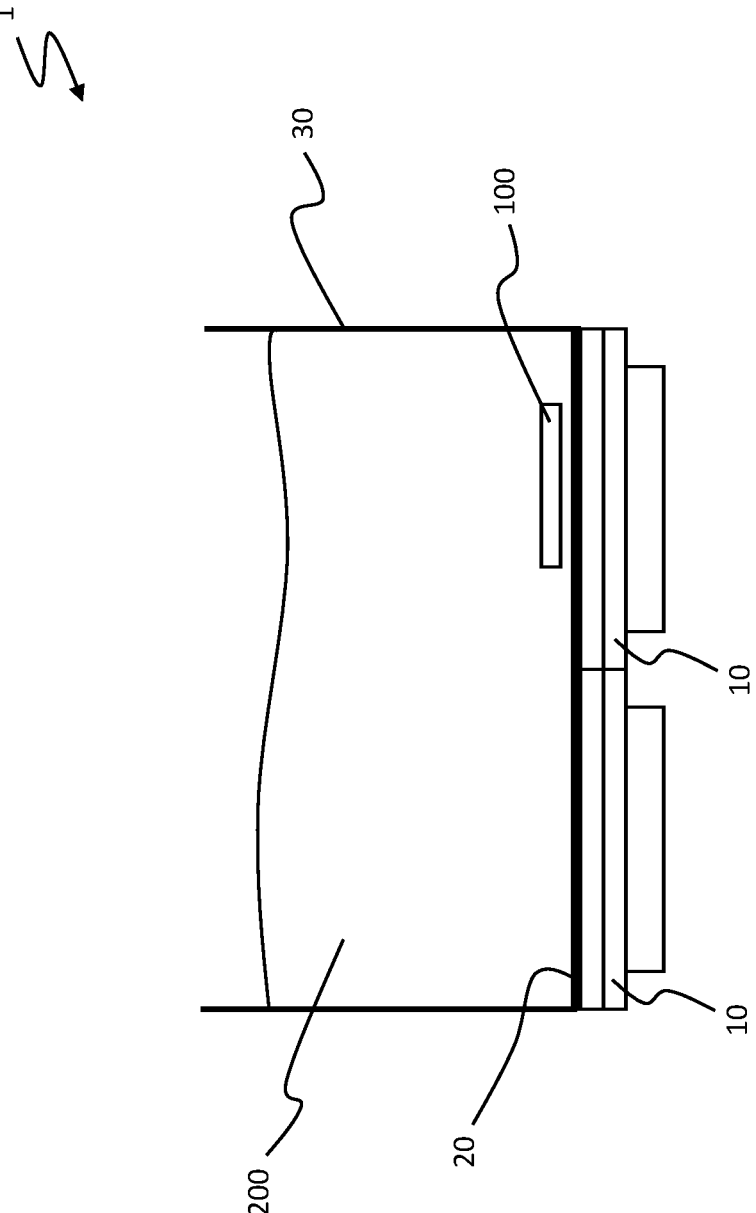
FIG. 17 shows a further planar drive system.

FIG. 17 shows a planar drive system 1 having two stator modules 10, a rotor 100 and a separating device 20 disposed between the stator modules 10 and the rotor 100. The separating device 20 is in turn part of an operating housing 30, wherein a liquid 200 is located in the operating housing 30. The fluid 200 may be particularly aggressive to the magnetic units 114 or an adhesive used to glue the magnetic units 114 in the rotor 100, and thus it may be useful to render the housing 110 of the rotor 100 fluid-tight, as described in connection with FIGS. 1 to 10.

Figure 18:
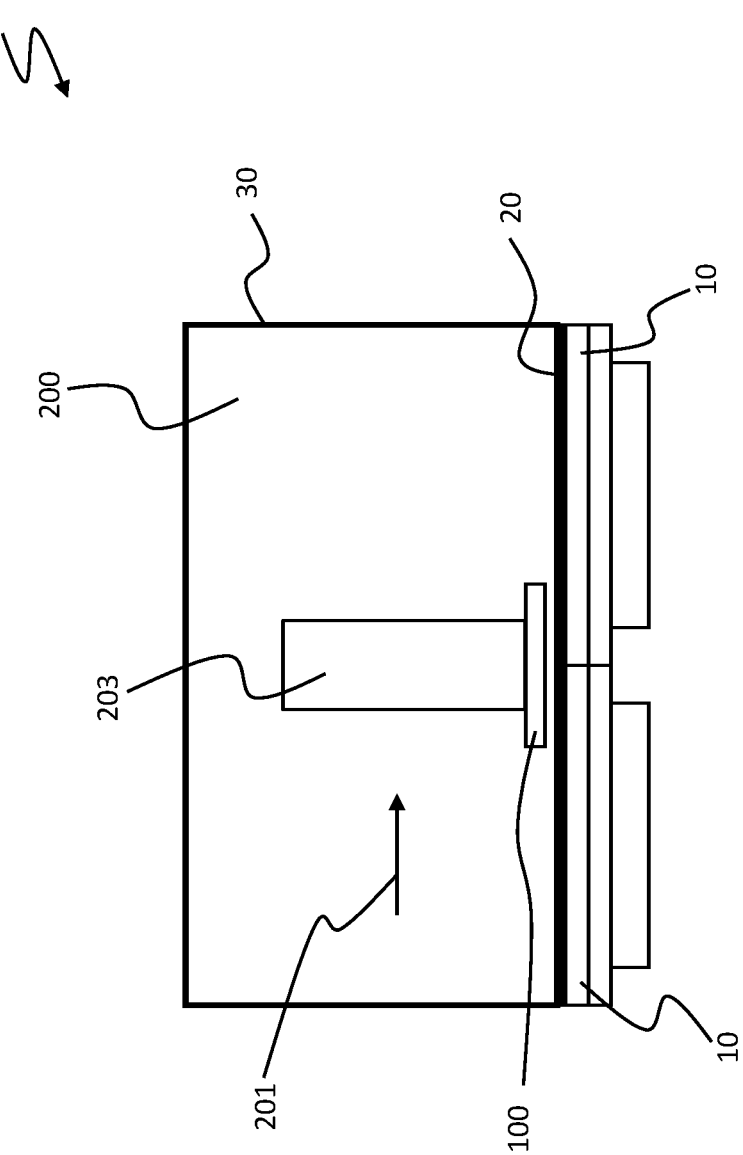
FIG. 18 shows a further planar drive system.

FIG. 18 shows a planar drive system 1 in which the operating housing 30 is also filled with a liquid 200. In this case, the planar drive system 1 essentially corresponds to the planar drive system 1 of FIG. 17, provided that no differences are described below. In this case, the operating housing 30 is completely closed. A first fluid flow 201 moves within the operating housing 30. The rotor 100 comprises a guide plate 203.

Figure 19:
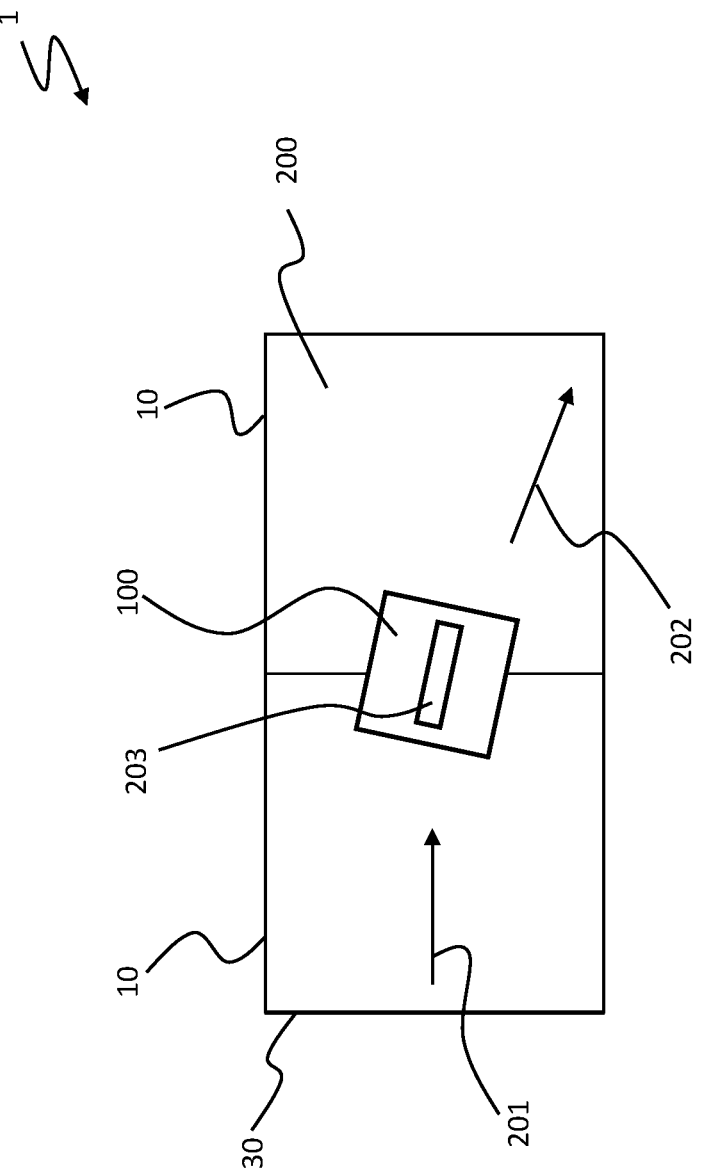
FIG. 19 shows a top view of the planar drive system of FIG. 18.

FIG. 19 shows a top view of the planar drive system 1 of FIG. 18, in which the rotor 100 is embodied in a rotatable manner, as described in other applications of the applicant. With the aid of the guide plate 203, the first fluid flow 201 may be deflected and as a result a second fluid flow 202 with a different direction may be generated. Thus, by allowing the rotor 100 to flexibly move within the operating housing 30, fluid flows within the operating housing 30 may be influenced. It should be noted that at any position above the stator surface 13, the rotor may be rotated by up to 20° from a resting position. In special rotational positions, each involving the contact point of four stator assemblies 11, the rotors 100 may also be fully rotated.

Figure 20:
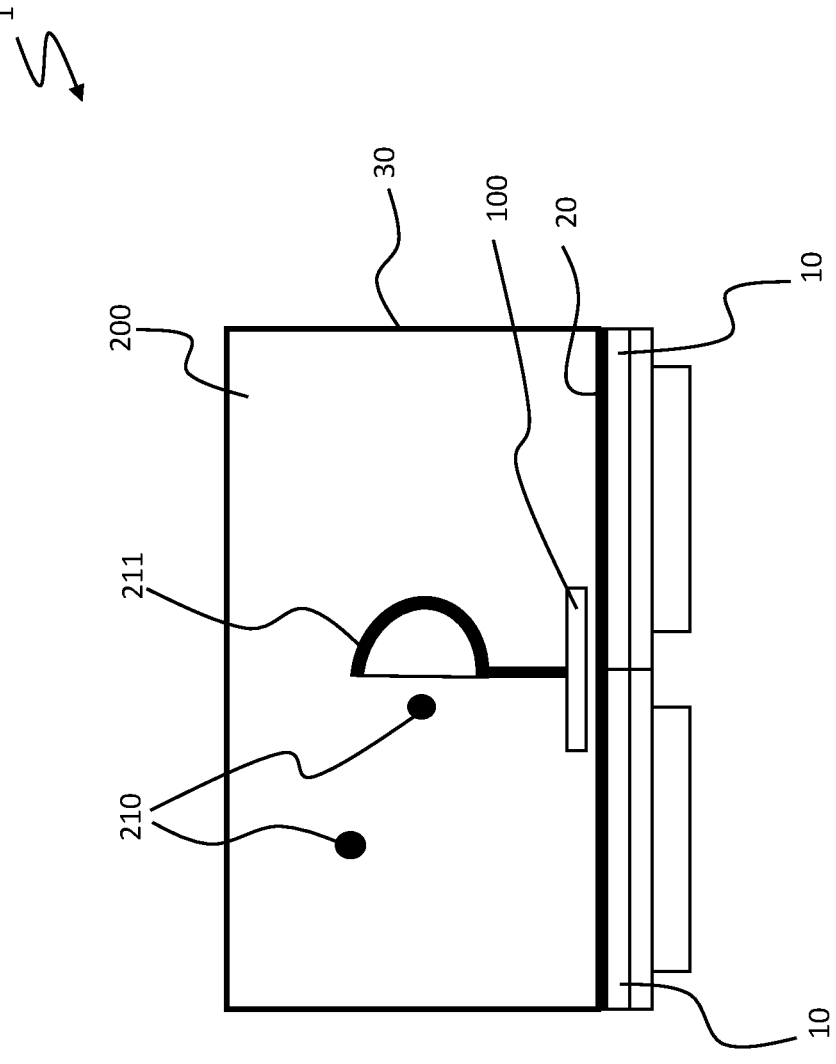
FIG. 20 shows a further planar drive system.

FIG. 20 shows a planar drive system 1 that corresponds to the planar drive system 1 of FIG. 17, unless differences are described in the following. Objects 210 are arranged within the operating housing 30. The rotor 100 includes a catching device 211 for catching the objects 210 suspended or moving in the fluid 200. The objects 210 may cover a wide range of objects 210 from fish to contaminants. Thus, by allowing the rotor 100 to be moved to any position, an object capturing system may be provided. To this end, the catching device 211 may include a screen, a landing net, a catching container, and/or a filter. Furthermore, sensors may be provided for detecting the objects 210.

Figure 21:
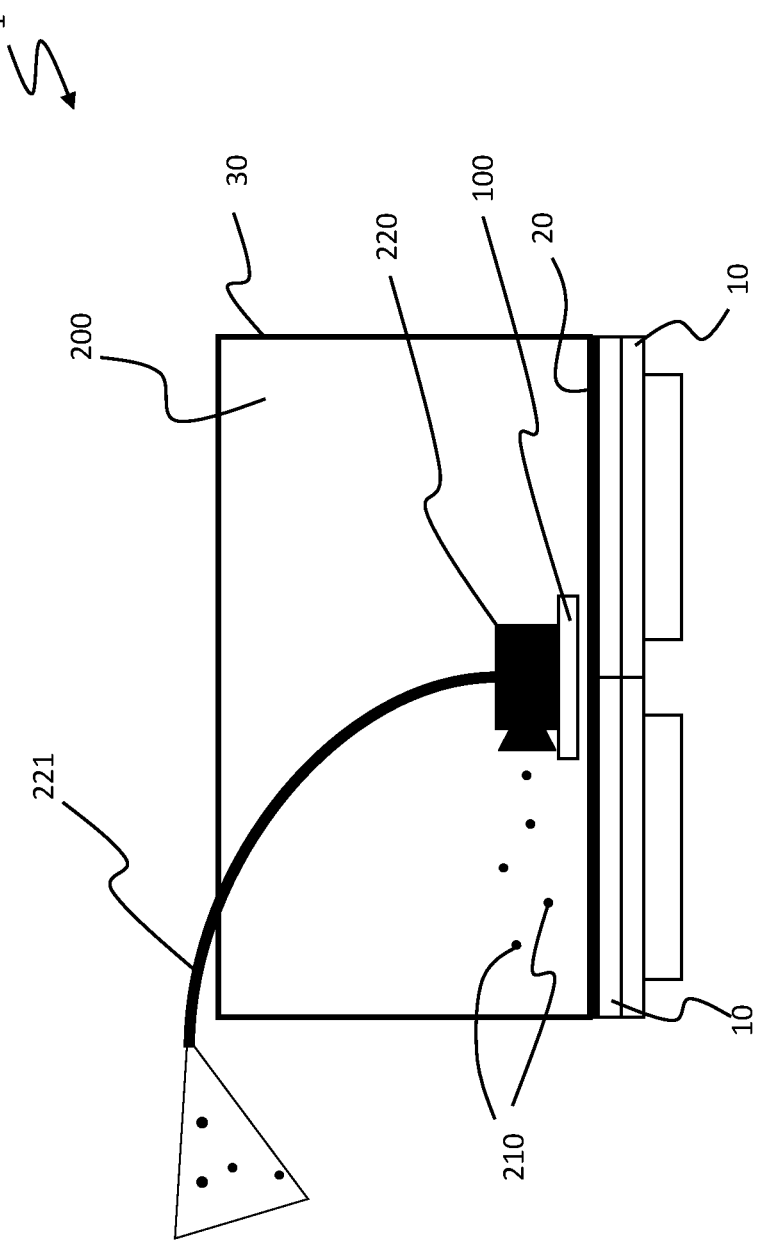
FIG. 21 shows a further planar drive system.

FIG. 21 shows a planar drive system 1 that corresponds to the planar drive system 1 of FIG. 17, unless differences are described in the following. A pump 220 is arranged on the rotor 100, with the aid of which objects 210 present within the liquid 200 may be pumped out of the liquid 200 and moved to the outside of the operating vessel 30 via a hose 221. It may be provided that the pump 220 is supplied with energy from outside the working vessel 30 with the aid of a cable or with the aid of batteries. It may further be provided that a bucket wheel having a generator is arranged on the rotor, which is used to provide electrical energy to the pump 220. It may further be provided that a bucket wheel at the rotor 100 directly drives the pump 220. The drive may be provided by a movement of the rotor 100 within the fluid 200 resulting in a movement of the bucket wheel, thus driving the pump 220.

Figure 22:
FIG. 22 shows a further planar drive system.
Figure 22:
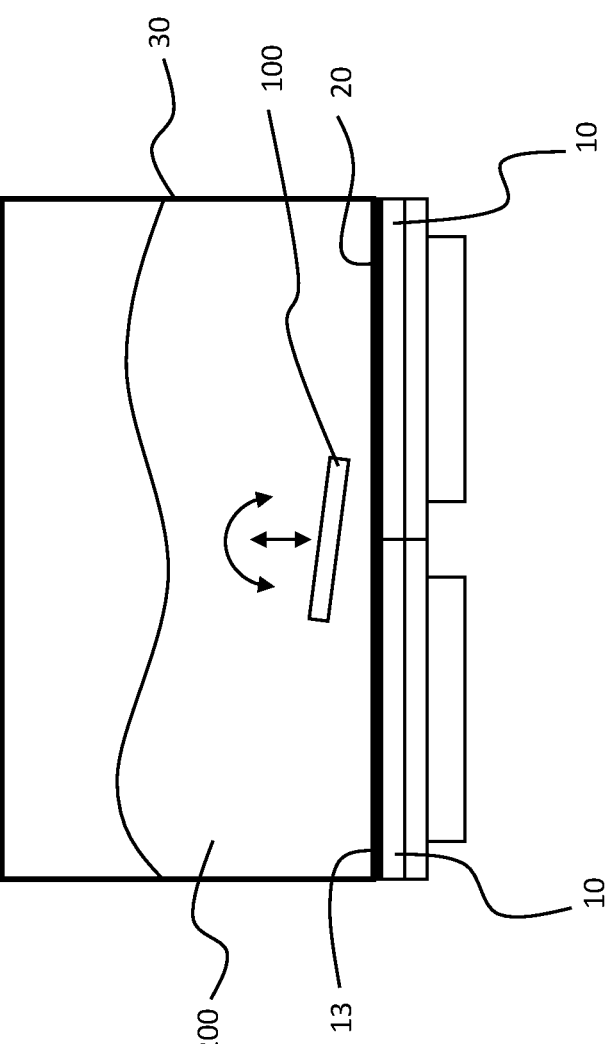

FIG. 22 shows a further planar drive system 1 that corresponds to the planar drive system 1 of FIG. 17, provided that no differences are described in the following. In contrast to FIG. 17, the operating housing 30 is not completely filled with the fluid 200, but only partially. By movements of the rotor 100, such as movements perpendicular to the stator surface 13, or by tilting the rotor 100 from the resting position, a wave impact of the fluid 200 may be generated as a result.

Figure 23:
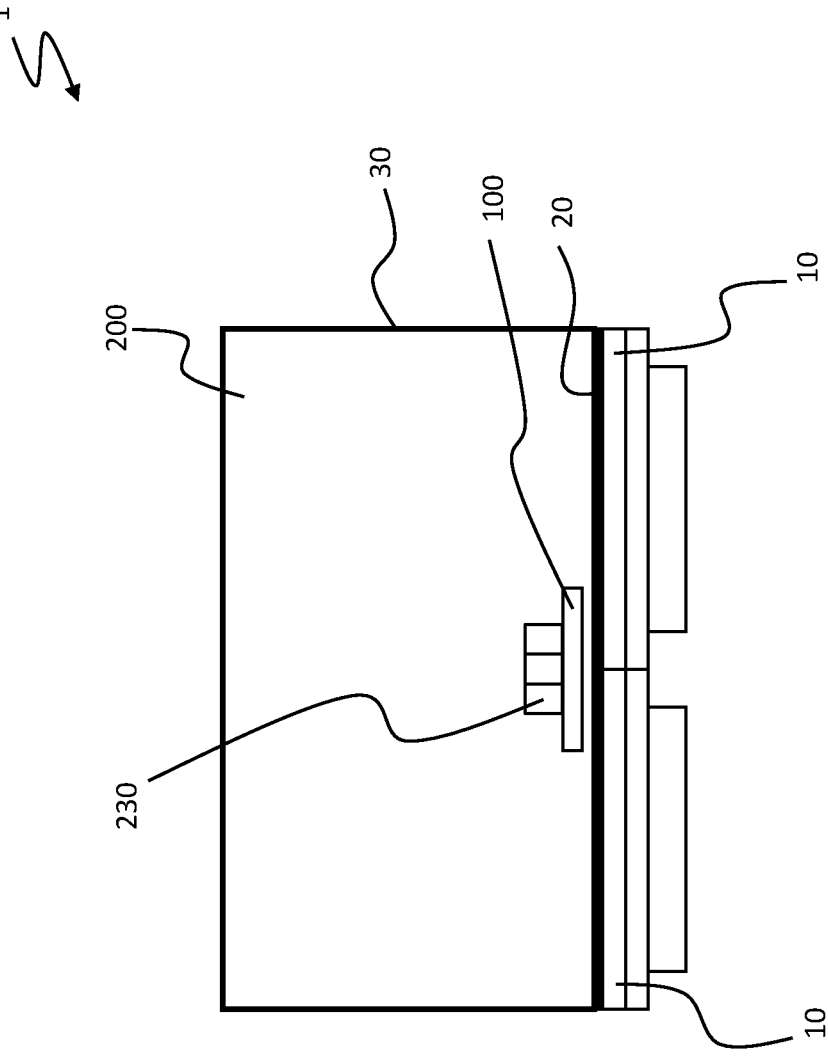
FIG. 23 shows a further planar drive system.

FIG. 23 shows a planar drive system 1 corresponding to the planar drive system 1 of FIG. 17, unless differences are described in the following. The rotor 100 has a bucket wheel 230 which may be rotated at rotational positions at the contact point of four stator assemblies 11 by carrying out rotation of the rotor 100 at that position. Thus, the fluid 200 may be mixed with the aid of the rotation of the rotor 100 and the bucket wheel 230. Due to the possibility of controlling the rotor 100 individually, any mixing trajectories may be generated.

Figure 24:
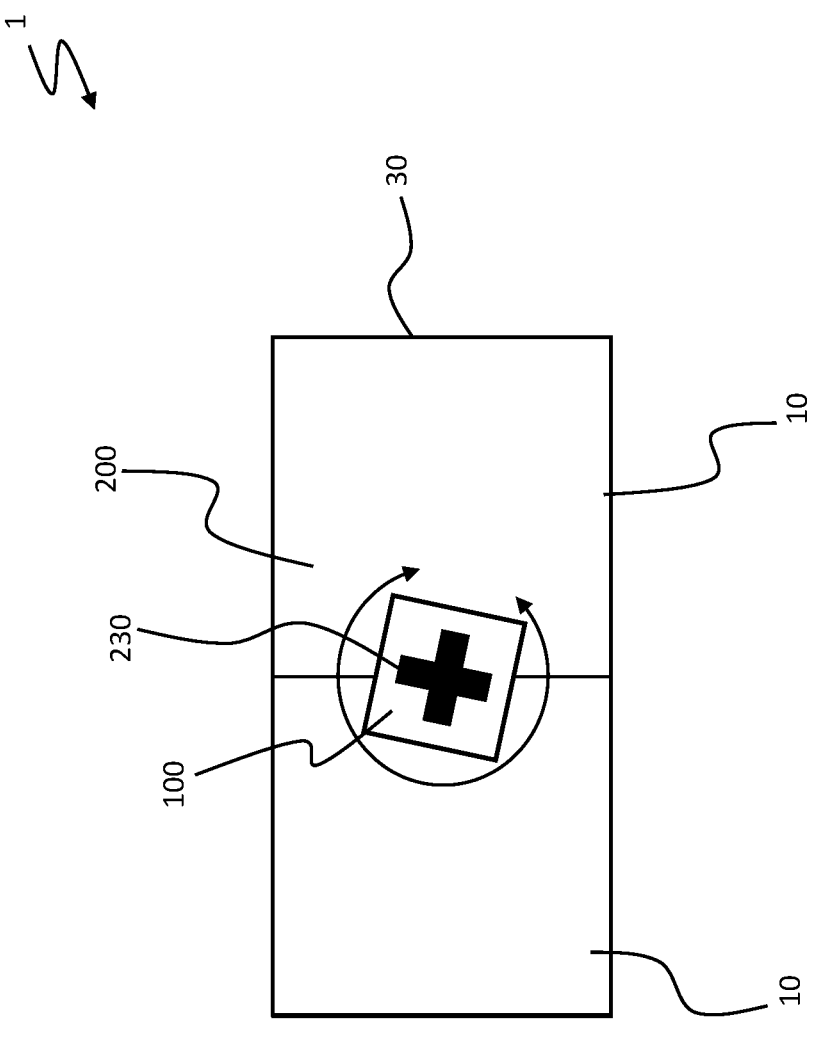
FIG. 24 shows a top view of the planar drive system of FIG. 23.

FIG. 24 shows a top view of the planar drive system 1 of FIG. 23. The rotor 100 is rotated from its resting position. The rotor 10 is thereby embodied to be rotatable, as described in other applications of the applicant. As a result of the fact that the rotor 10 may be flexibly moved within the operating housing 30, fluid flows within the operating housing 30 may thus be influenced. It should be noted that at any position above the stator surface 13, the rotor may be rotated by up to 20° from a resting position. In special rotational positions, each involving the contact point of four stator assemblies 11, the rotors 10 may also be fully rotated.

Figure 25:
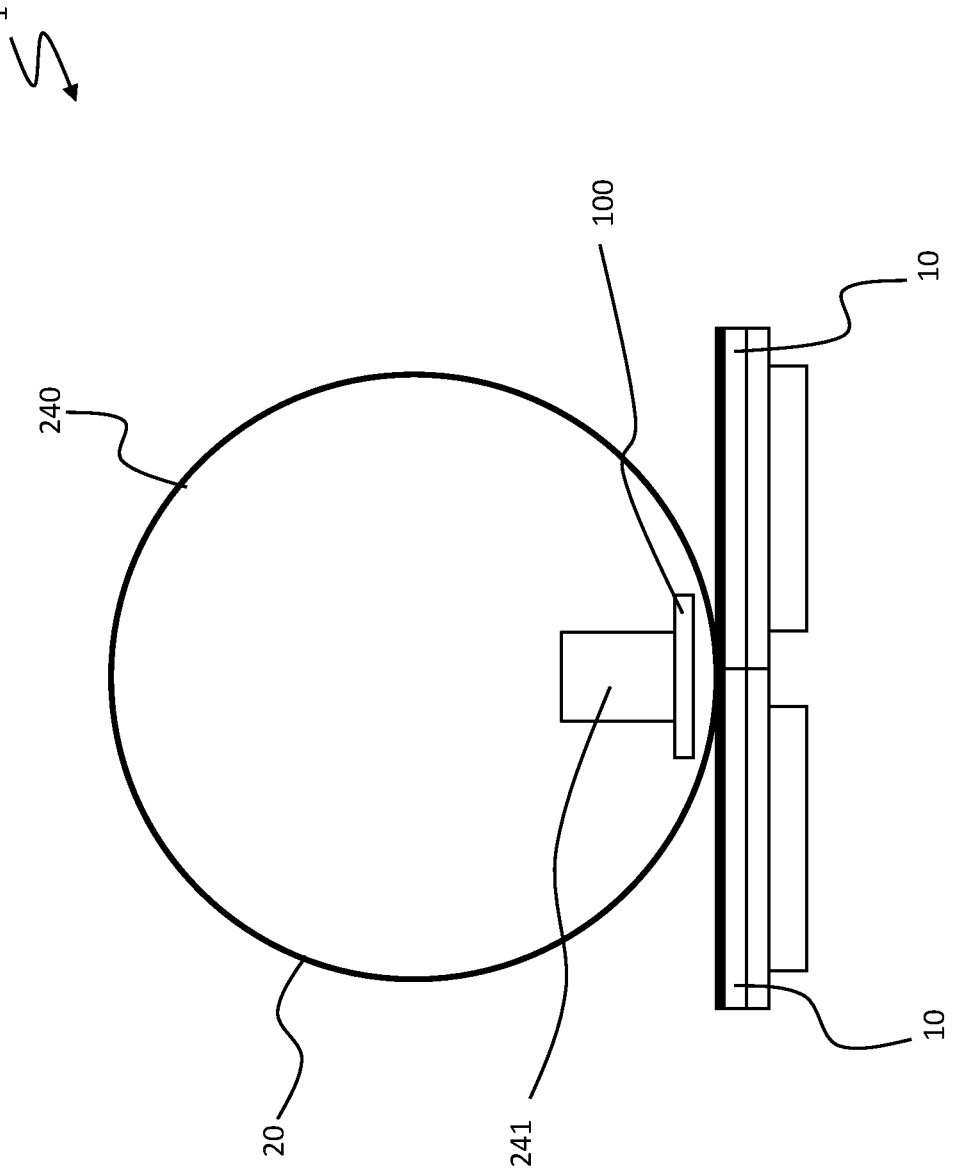
FIG. 25 shows a further planar drive system.

FIG. 25 shows a cross-sectional view of a further planar drive system 1. In this embodiment example, two stator modules 10 are additionally arranged with a rotor 100 arranged above the stator modules 10. In this embodiment example, the separating device 20 is part of a product 240 to be processed or inspected. A wall of the product is guided between the stator modules 10 and the rotor 100. A measuring or processing head 241 is arranged on the rotor 100, which may be used to examine or process the product 240.

TABLE 1

| List of reference numerals |
| --- |
| 1 planar drive system |
| 10 stator module |
| 11 stator assembly |
| 12 coil arrangement |
| 13 stator surface |
| 20 separating device |
| 21 first side |
| 22 second side |
| 23 thickness |
| 30 operating housing |
| 31 inner area |
| 41 first vacuum chamber |
| 42 second vacuum chamber |
| 43 chamber wall |
| 44 vacuum lock |
| 45 third vacuum chamber |
| 46 fourth vacuum chamber |
| 47 first gate |
| 48 second gate |
| 49 outer area |
| 51 backing pump |
| 52 turbopump |
| 54 valve control |
| 55 first pressure sensor |
| 56 second pressure sensor |
| 57 vacuum duct |
| 60 printed circuit board |
| 61 pin |

TABLE 1-continued

List of reference numerals

| | |
|---|---|
| 62 | via |
| 63 | socket |
| 64 | seal |
| 100 | rotor |
| 101 | mounting device |
| 102 | through hole |
| 103 | top side |
| 104 | bottom side |
| 105 | side surface |
| 110 | housing |
| 111 | basic housing body |
| 112 | cover |
| 113 | recess |
| 114 | magnet arrangement |
| 115 | interior |
| 116 | laser-welded joint |
| 117 | edge area |
| 118 | metal sheet thickness |
| 119 | casting compound |
| 130 | evacuating device |
| 131 | pipe |
| 132 | soldered area |
| 211 | catching device |
| 220 | pump |
| 221 | hose |
| 230 | bucket wheel |
| 240 | product |
| 241 | measuring or processing head |
| 200 | liquid |
| 201 | first fluid flow |
| 202 | second liquid flow |
| 203 | guide plate |
| 210 | object |

The invention claimed is:

1. A rotor having:

a housing, and at least one magnet arrangement;

the housing comprising a basic housing body and a cover, and the magnet arrangement being arranged in a recess of the basic housing body;

wherein the cover is attached to the basic housing body in such a way that the housing is configured to be fluid-tight, the cover covers the recess and the magnet arrangement is arranged in an interior of the fluid-tight housing;

wherein the basic housing body and the cover have a metallic configuration, and wherein the cover and the basic housing body are laser-welded, wherein a laser-welded joint is circumferentially arranged between the basic housing body and the cover in an edge region of the housing.

2. The rotor according to claim 1, wherein the cover is non-magnetic.

3. The rotor according to claim 1, wherein the cover has a relative magnetic permeability of less than ten, less than two, or less than 1.01.

4. The rotor according to claim 1, wherein the cover attenuates a magnetic field of the magnet arrangement outside of the housing by a maximum of 25 percent, or by a maximum of 10 percent.

5. The rotor according to claim 1, wherein the cover comprises a metal sheet, wherein a metal sheet thickness of the metal sheet is between 0.05 and 0.5 millimeters, between 0.09 and 0.11 millimeters, or about 0.1 millimeters.

6. A rotor comprising:

a housing, and at least one magnet arrangement;

the housing comprising a basic housing body and a cover, and the at least one magnet arrangement being arranged in a recess of the basic housing body;

wherein the cover is attached to the basic housing body such that the housing is configured to be fluid-tight, wherein the cover covers the recess and the at least one magnet arrangement is arranged in an interior of the fluid-tight housing; and wherein the basic housing body and the cover comprise a plastic, and wherein the cover and the basic housing body are laser-welded.

7. A rotor comprising:

a housing, and at least one magnet arrangement;

the housing comprising a basic housing body and a cover, and the at least one magnet arrangement being arranged in a recess of the basic housing body;

wherein the cover is attached to the basic housing body such that the housing is configured to be fluid-tight, wherein the cover covers the recess and the at least one magnet arrangement is arranged in an interior of the fluid-tight housing; and wherein the interior of the fluid-tight housing is at least partially evacuated.

8. The rotor according to claim 7, wherein an evacuating device is attached to the housing, wherein the evacuating device comprises a welded or soldered pipe.

9. A rotor having:

a housing, and at least one magnet arrangement;

the housing comprising a basic housing body and a cover, and the at least one magnet arrangement being arranged in a recess of the basic housing body;

wherein the cover is attached to the basic housing body such that the housing is configured to be fluid-tight, wherein the cover covers the recess and the at least one magnet arrangement is arranged in an interior of the fluid-tight housing; and wherein the interior of the fluid-tight housing is at least partially filled with a casting compound.

10. The rotor according to claim 9, wherein the interior of the fluid-tight housing is potted with a PU casting compound in a substantially bubble-free manner.

11. The rotor according claim 1, wherein the interior of the fluid-tight housing is substantially free of water.

12. The rotor according to claim 1, wherein the magnet arrangement is configured for interacting with a stator magnetic field and thereby driving the rotor.

13. A planar drive system having:

at least one stator module;

wherein the stator module comprises at least one stator assembly with at least one coil arrangement, wherein the coil arrangement is energizable and is arranged to generate a stator magnetic field above a stator surface due to an energization, wherein the planar drive system further comprises a rotor, wherein the rotor is movable above the stator surface via of an interaction between the stator magnetic field and a rotor magnetic field of the magnet arrangement, wherein the planar drive system further comprises a separating device, wherein the separating device is arranged above the stator surface, and wherein the stator module is arranged on a first side of the separating device and the rotor is arranged on a second side of the separating device; and wherein the separating device is part of an operating housing, the rotor being movable within the operating housing.

14. The planar drive system according to claim 13, wherein the separating device is non-magnetic.

15. The planar drive system according to claim 13, wherein the separating device has a relative magnetic permeability smaller than ten, smaller than two or smaller than 1.01.

16. The planar drive system according to claim 13, wherein the separating device is between 0.5 and 1 millimeter thick.

17. The planar drive system according to claim 13, wherein the operating housing comprises a first vacuum chamber.

18. The planar drive system according to claim 17, wherein the stator module is arranged within a second vacuum chamber, wherein the separating device separates the first vacuum chamber from the second vacuum chamber.

19. The planar drive system according to claim 18, wherein an equalizing valve is arranged between the first vacuum chamber and the second vacuum chamber, wherein the equalizing valve is arranged to equalize a pressure difference between the first vacuum chamber and the second vacuum chamber when the pressure difference is larger than 5 millibars.

20. The planar drive system according to claim 19, wherein the equalizing valve is configured as a pressure relief valve.

21. The planar drive system according to claim 20, wherein the equalizing valve is configured as a controlled valve, wherein a valve control is connected to a first pressure sensor of the first vacuum chamber and to a second pressure sensor of the second vacuum chamber.

22. The planar drive system according to claim 18, wherein the stator module is connected to a vacuum duct, the vacuum duct being set up to provide a data connection and a current supply to the stator module from outside of the second vacuum chamber.

23. The planar drive system according to claim 22, wherein the vacuum duct comprises a printed circuit board, the printed circuit board being part of a wall of the second vacuum chamber, the printed circuit board comprising pins for current feedthrough and vias for data connection.

24. The planar drive system according to claim 17, wherein the first vacuum chamber is configured to be evacuated via a backing pump and a turbopump.

25. A planar drive system comprising:

a rotor, the rotor comprising a basic housing body with a recess, at least one magnet arrangement being arranged in the recess, and a cover adapted to the basic housing body in such a way that a housing is formed by the basic housing body and the cover, the housing being configured to be fluid-tight, and a magnet arrangement arranged in an interior of the fluid-tight housing;

wherein the rotor is disposed in a vacuum during attachment of the cover or the rotor is heated to more than 100 degrees Celsius prior to and/or during attachment of the cover, such that the interior of the fluid-tight housing is substantially free of water.

26. The planar drive system according to claim 25, wherein the basic housing body and the cover have a metallic embodiment configuration, and wherein the cover and the basic housing body are laser-welded.

* * * * *